(12) United States Patent
Park et al.

(10) Patent No.: US 11,700,369 B2
(45) Date of Patent: *Jul. 11, 2023

(54) IMAGE INFORMATION ENCODING AND DECODING METHOD

(71) Applicant: LG ELECTRONICS INC., Seoul (KR)

(72) Inventors: Seung Wook Park, Seoul (KR); Jae Hyun Lim, Seoul (KR); Jung Sun Kim, Seoul (KR); Joon Young Park, Seoul (KR); Young Hee Choi, Seoul (KR); Byeong Moon Jeon, Seoul (KR); Yong Joon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,842

(22) Filed: Mar. 8, 2022

(65) Prior Publication Data

US 2022/0191489 A1 Jun. 16, 2022

Related U.S. Application Data

(63) Continuation of application No. 17/158,695, filed on Jan. 26, 2021, now Pat. No. 11,303,893, which is a (Continued)

(51) Int. Cl.
*H04N 19/117* (2014.01)
*H04N 19/70* (2014.01)
(Continued)

(52) U.S. Cl.
CPC ........... *H04N 19/117* (2014.11); *H04N 19/13* (2014.11); *H04N 19/139* (2014.11); *H04N 19/14* (2014.11);
(Continued)

(58) Field of Classification Search
None
See application file for complete search history.

(56) References Cited

U.S. PATENT DOCUMENTS 9,143,803 B2 * 9/2015 Karczewicz ........... H04N 19/80
9,253,489 B2 2/2016 Park et al.
(Continued)

FOREIGN PATENT DOCUMENTS

CA 2811376 A1 4/2012
CN 1728833 A 2/2006
(Continued)

OTHER PUBLICATIONS

U.S. Appl. No. 16/712,239, filed Dec. 12, 2019.
(Continued)

*Primary Examiner* — Mohammad J Rahman
(74) *Attorney, Agent, or Firm* — Dentons US LLP

(57) ABSTRACT

The present invention relates to an image information encoding and decoding method and a device for same. One embodiment of an image information encoding method according to the present invention, as an image information encoding method according to another embodiment of the present invention, includes the steps of: generating a restore block; applying a deblocking filter on the restore block; applying a Sample Adaptive Offset (SAO) on the restore block having the deblocking filter applied thereon; and transmitting information on the SAO application. During the applying of the SAO, the SAO is applied to chroma pixels, and during the transmitting of the information, in addition to information on whether the SAO is applied on the chroma pixels, at least one of area information, division information on the SAO coverage area, SAO type information, and SAO offset information is transmitted.

9 Claims, 15 Drawing Sheets

Related U.S. Application Data continuation of application No. 16/712,239, filed on Dec. 12, 2019, now Pat. No. 10,944,968, which is a continuation of application No. 16/113,730, filed on Aug. 27, 2018, now Pat. No. 10,547,837, which is a continuation of application No. 15/648,206, filed on Jul. 12, 2017, now Pat. No. 10,091,505, which is a continuation of application No. 14/990,405, filed on Jan. 7, 2016, now Pat. No. 9,743,083, which is a continuation of application No. 14/129,216, filed as application No. PCT/KR2011/009720 on Dec. 16, 2011, now Pat. No. 9,294,770.

(60) Provisional application No. 61/500,617, filed on Jun. 24, 2011.

(51) Int. Cl.

| | |
|---|---|
| H04N 19/14 | (2014.01) |
| H04N 19/186 | (2014.01) |
| H04N 19/82 | (2014.01) |
| H04N 19/13 | (2014.01) |
| H04N 19/139 | (2014.01) |
| H04N 19/176 | (2014.01) |
| H04N 19/91 | (2014.01) |

(52) U.S. Cl.
 CPC ......... *H04N 19/176* (2014.11); *H04N 19/186* (2014.11); *H04N 19/70* (2014.11); *H04N 19/82* (2014.11); *H04N 19/91* (2014.11)

(56) References Cited

U.S. PATENT DOCUMENTS

| | | | |
|---|---|---|---|
| 9,294,770 | B2 | 3/2016 | Park et al. |
| 9,819,966 | B2* | 11/2017 | Chong ............... H04N 19/14 |
| 2006/0244868 | A1* | 11/2006 | Jia ..................... H04N 5/21 |
| | | | 348/E5.077 |
| 2006/0250653 | A1 | 11/2006 | Joch et al. |
| 2008/0069247 | A1 | 3/2008 | He |
| 2008/0170615 | A1 | 7/2008 | Sekiguchi |
| 2008/0181304 | A1 | 7/2008 | Sekiguchi |
| 2008/0202320 | A1 | 8/2008 | Skowronek ........... G06F 16/634 |
| | | | 84/609 |
| 2008/0317377 | A1 | 12/2008 | Saigo et al. |
| 2009/0180556 | A1* | 7/2009 | Jang ................. H04N 9/72 |
| | | | 375/240.29 |
| 2010/0254454 | A1 | 10/2010 | Nakagawa |
| 2011/0014559 | A1 | 1/2011 | Wosnick et al. |
| 2011/0090969 | A1 | 4/2011 | Sung et al. |
| 2011/0305274 | A1 | 12/2011 | Fu et al. |
| 2012/0177107 | A1 | 7/2012 | Fu ................. H04N 19/167 |
| | | | 375/240.03 |
| 2012/0207227 | A1 | 8/2012 | Tsai |
| 2012/0287988 | A1* | 11/2012 | Chong ................ H04N 19/196 |
| | | | 375/E7.126 |
| 2012/0294353 | A1 | 11/2012 | Fu et al. |
| 2013/0022103 | A1 | 1/2013 | Budagavi |
| 2013/0113880 | A1* | 5/2013 | Zhao ................. H04N 19/82 |
| | | | 348/43 |
| 2013/0170554 | A1 | 7/2013 | Matsuo et al. |
| 2013/0177078 | A1 | 7/2013 | Lee ................... H04N 19/176 |
| | | | 375/240.12 |
| 2013/0182759 | A1 | 7/2013 | Kim |
| 2013/0215959 | A1 | 8/2013 | Chen et al. |
| 2013/0259118 | A1 | 10/2013 | Fu |
| 2013/0294705 | A1 | 11/2013 | Kondo ................ G06T 5/001 |
| | | | 382/238 |
| 2013/0322523 | A1 | 12/2013 | Huang |
| 2013/0329784 | A1 | 12/2013 | Chuang et al. |
| 2014/0119433 | A1 | 5/2014 | Park et al. |
| 2014/0126630 | A1 | 5/2014 | Park et al. |
| 2014/0140416 | A1 | 5/2014 | Yamazaki |
| 2014/0355695 | A1 | 12/2014 | Lim et al. |
| 2015/0071356 | A1 | 3/2015 | Kim et al. |
| 2015/0215617 | A1* | 7/2015 | Leontaris ............. H04N 19/147 |
| | | | 375/240.03 |
| 2017/0318289 | A1 | 11/2017 | Choi et al. |
| 2019/0014317 | A1 | 1/2019 | Park et al. |

FOREIGN PATENT DOCUMENTS

| | | |
|---|---|---|
| CN | 1925619 A | 3/2007 |
| CN | 101222644 A | 7/2008 |
| CN | 101399991 A | 4/2009 |
| CN | 101459847 A | 6/2009 |
| CN | 101507267 A | 8/2009 |
| CN | 101646085 A | 2/2010 |
| CN | 101690220 A | 3/2010 |
| CN | 101783957 A | 7/2010 |
| CN | 101895761 A | 11/2010 |
| CN | 101971632 A | 2/2011 |
| CN | 103535035 A | 1/2014 |
| EP | 1 950 971 A2 | 7/2008 |
| EP | 2 605 516 A1 | 6/2013 |
| EP | 2 725 797 A1 | 4/2014 |
| JP | 2007-536828 A | 12/2007 |
| JP | 2010-245734 A | 10/2010 |
| JP | 2010245734 A | 10/2010 |
| KR | 10-2010-0030638 A | 3/2010 |
| KR | 10-2010-0081148 A | 7/2010 |
| KR | 10-2013-0092514 A | 8/2013 |
| WO | 20051117447 A2 | 12/2005 |
| WO | 2006104365 A1 | 10/2006 |
| WO | 2010077071 A2 | 7/2010 |
| WO | 20101077071 A2 | 7/2010 |
| WO | 20121155553 A1 | 11/2012 |

OTHER PUBLICATIONS

U.S. Appl. No. 16/113,730, filed Aug. 27, 2018, now U.S. Pat. No. 10,547,837.

U.S. Appl. No. 15/648,206, filed Jul. 12, 2017, now U.S. Pat. No. 10,091,505.

U.S. Appl. No. 14/990,405, filed Jan. 7, 2016, now U.S. Pat. No. 9,743,083.

U.S. Appl. No. 14/129,216, filed Dec. 24, 2013, now U.S. Pat. No. 9,294,770.

MediaTek Inc., "CE13: Sample Adaptive Offset with LCU—Independent Decoding", Joint Collaborative Team on Video Coding (JCT-VC) of ITU-T SG16 WP3 and ISO/IEC JTC1/SC29/WG11, Mar. 16-23, 2011, JCTVC-E049.

MediaTek Inc., "CE13: Summary Report of Core Experiment on Sample Adaptive Offset", Joint Collaborative Team on Video Coding (JCT-VC) of ITU-T SG16 WP3 and ISO/IEC JTC1/SC29/WG11, Mar. 16-23, 2011, JCTVC-E033.

International Search Report dated Jul. 20, 2012 for Application No. PCT/KR2011/009720 with English Translation, 4 pages.

Supplementary European Office Action dated Nov. 6, 2014 for European Application No. 11868293.9, 12 pages.

C-M Fu et al: "Sample Adaptive Offset for Chroma", 97. MPEG Meeting; Jul. 18, 2011-Jul. 22, 2011; Torino; (Motion Picture Expert Group or ISOIIEC JTC1/SC291WG11), No. m20469, Jul. 20, 2011 (Jul. 20, 2011), XP030049033 (the whole document).

C-M Fu et al: "CE13: Sample Adaptive Offset with LCU—Independent Decoding", Mar. 10, 2011, No. JCTVC-E049, Oct. 2011 (Mar. 10, 2011), XP030008555, ISSN: 0000-0007 (the whole document).

C-M Fu et al: "Non-CE8: Offset coding in SAO", 98. MPEG Meeting; Nov. 28, 2011-Dec. 2, 2011; Geneva; (Motion Picture Expert Group or ISO/IEC JTC1/SC29/WG11), No. m21781, Nov. 21, 2011 (Nov. 21, 2011), XP030050344 (the whole document).

Anonymous: "High Efficiency Video Coding (HEVC) Working Draft 4", 97. MPEG Meeting;Jul. 18, 2011-Jul. 22, 2011; Torino; (Motion Picture Expert Group or ISO/IEC JTC1/SC29/VVG11), No. N12186, Oct. 2, 2011 (Oct. 2, 2011), XP030018681; paragraphs [7 .3.3.4]. [7 .4.3.4], [8.6.2].

(56) References Cited

OTHER PUBLICATIONS

U.S. Office Action dated Jul. 1, 2015 from corresponding U.S. Appl. No. 14/658,895, 10 pages.
Canadian Office Action dated Jul. 7, 2015 from corresponding Canadian Patent Application No. 2,840,476, 5 pages.
U.S. Final Office Action dated Sep. 22, 2015 for U.S. Appl. No. 14/658,895, 12 pages.
U.S. Appl. No. 61/486,504.

* cited by examiner (a)       (b)       (c)       (d)

(a)

(b)

(c)

(d)

(a)

(b)

(c)

(d)

IMAGE INFORMATION ENCODING AND DECODING METHOD

This application is a continuation of U.S. patent application Ser. No. 17/158,695, filed Jan. 26, 2021, which is continuation of U.S. application Ser. No. 16/712,239, filed Dec. 12, 2019, now U.S. Pat. No. 10,712,239, which is a continuation of application Ser. No. 16/113,730, filed Aug. 27, 2018, now U.S. Pat. No. 10,547,837, which is a continuation of U.S. application Ser. No. 15/648,206 filed Jul. 12, 2017, now U.S. Pat. No. 10,091,505, which is a continuation of application Ser. No. 14/990,405, filed Jan. 7, 2016, now U.S. Pat. No. 9,743,083, which is a continuation of application Ser. No. 14/129,216 filed Dec. 24, 2013, now U.S. Pat. No. 9,294,770, which is a U.S. National Phase Application under 35 U.S.C. § 371 of International Patent Application No. PCT/KR2011/009720, filed on Dec. 16, 2011, which claims the benefit of U.S. Provisional Patent Application No. 61/500,617, filed Jun. 24, 2011, all of which are hereby incorporated by reference in their entirety for all purposes as if fully set forth herein.

TECHNICAL FIELD

The present invention relates to an image compression technique, and more particularly, to a method of applying a sample adaptive offset (SAO) as an in-loop filter.

BACKGROUND ART

In recent years, demands for a high-resolution and high-quality video have increased in various fields of applications. As a video has a higher resolution and higher quality, an amount of data on the video increases more and more. Accordingly, when video data is transferred using media such as existing wired or wireless broadband lines or video data is stored in existing storage media, the transfer cost and the storage cost of data increase.

In order to effectively transfer, store, and reproduce information on high-resolution and high-quality video, high-efficiency video compression techniques can be utilized.

In order to enhance video compression efficiency, inter prediction and intra prediction can be utilized. In the inter prediction method, pixel values of a current picture are predicted with reference to information of another picture. In the intra prediction method, pixel values of a current picture are predicted using inter-pixel relationships in the same picture.

SUMMARY OF THE INVENTION

Technical Problem

An object of the invention is to provide a method of adaptively applying an SAO to improve an picture reconstruction effect.

Another object of the invention is to provide a method of applying an SAO in consideration of an occurrence frequency of a pixel by intensity.

Still another object of the invention is to provide a method of transmitting information for applying an SAO to only an effective band from an encoder to a decoder.

Still another object of the invention is to provide a method of applying plural SAOs depending on an SAO application unit.

Still another object of the invention is to provide a method and a device for applying an SAO on chroma pixels so as to enhance a shape reconstruction effect.

Still another object of the invention is to provide a method of applying an SAO in consideration of characteristics of chroma pixels.

Solution to Problem (1) According to an aspect of the invention, there is provided a video information encoding method including the steps of: generating a reconstructed block; applying a deblocking filter to the reconstructed block; applying a sample adaptive offset (SAO) to the reconstructed block to which the deblocking filter has been applied; and transmitting information on the application of the SAO, wherein the step of applying the SAO includes adaptively applying the SAO depending on an SAO application region to which the SAO will be applied.

(2) In the video information encoding method according to (1), the step of applying the SAO may include dividing an intensity section having a high occurrence frequency into bands of a finer intensity unit and applying a band offset.

(3) In the video information encoding method according to (1), the step of applying the SAO may include applying a band offset to an intensity section having a high occurrence frequency, and the step of transmitting information may include transmitting information on a section to which the band offset is applied.

(4) In the video information encoding method according to (1), the step of applying the SAO may include applying an offset to only a band having a high occurrence frequency, and the step of transmitting information may include transmitting information on the applied offset.

(5) In the video information encoding method according to (1), the step of applying the SAO may include selectively applying a plurality of different edge offsets to pixels of one SAO application region.

(6) According to another aspect of the invention, there is provided a video information encoding method including the steps of: generating a reconstructed block; applying a deblocking filter to the reconstructed block; applying a sample adaptive offset (SAO) to the reconstructed block to which the deblocking filter has been applied; and transmitting information on the application of the SAO, wherein the step of applying the SAO includes applying the SAO to chroma pixels, and wherein the step of transmitting information includes transmitting at least one of region information, division information of an SAO application region, SAO type information, and SAO offset information along with information on whether to apply the SAO to the chroma pixels.

(7) In the video information encoding method according to (6), the step of applying the SAO may include setting an SAO application region for chroma independently of an SAO application region for luma.

(8) In the video information encoding method according to (6), the step of applying the SAO may include classifying intensities of chroma pixels and applying a band offset to a band located in a section of a high occurrence frequency in the entire intensity range.

(9) In the video information encoding method according to (6), the step of applying the SAO may include determining to which of a case where the intensity of at least one of neighboring chroma pixels is greater than the intensity of a current pixel and a case where the intensity of at least one of neighboring chroma pixels is less than the intensity of the current chroma pixel a relationship between the current chroma pixel and the neighboring chroma pixels belongs and applying an edge offset to the current chroma pixel depending on the determination result.

(10) In the video information encoding method according to (6), the step of transmitting information may include separately transmitting the SAO information for luma and chroma.

(11) According to still another aspect of the invention, there is provided a video information decoding method including the steps of: receiving information; generating a reconstructed block on the basis of the received information; applying a deblocking filter to the reconstructed block; and applying a sample adaptive offset (SAO) to the reconstructed block to which the deblocking filter has been applied, wherein the step of applying the SAO includes adaptively applying the SAO depending on an SAO application region to which the SAO will be applied.

(12) In the video information decoding method according to (11), the step of applying the SAO may include dividing an intensity section having a high occurrence frequency into bands of a finer intensity unit and applying a band offset.

(13) In the video information decoding method according to (11), the step of applying the SAO may include applying a band offset to an intensity section having a high occurrence frequency, and the intensity section having a high occurrence frequency may be determined on the basis of the received information.

(14) In the video information decoding method according to (11), the step of applying the SAO may include applying an offset to only a band corresponding to the offset included in the received information out of the total bands.

(15) In the video information decoding method according to (11), the step of applying the SAO may include selectively applying a plurality of different edge offsets to pixels of one SAO application region, and the selectively-applied edge offsets may be determined on the basis of the received information.

(16) According to still another aspect of the invention, there is provided a video information decoding method including the steps of: receiving information; generating a reconstructed block; applying a deblocking filter to the reconstructed block; and applying a sample adaptive offset (SAO) to the reconstructed block to which the deblocking filter has been applied, wherein the step of applying the SAO includes applying the SAO to chroma pixels, and wherein the information received in the step of receiving information includes at least one of region information, division information of an SAO application region, SAO type information, and SAO offset information along with information on whether to apply the SAO to the chroma pixels.

(17) In the video information decoding method according to (16), an SAO application region for chroma in the step of applying the SAO may be set independently of an SAO application region for luma.

(18) In the video information decoding method according to (16), the step of applying the SAO may include classifying intensities of chroma pixels and applying a band offset to a band located in a section of a high occurrence frequency in the entire intensity range.

(19) In the video information decoding method according to (16), the step of applying the SAO may include determining to which of a case where the intensity of at least one of neighboring chroma pixels is greater than the intensity of a current pixel and a case where the intensity of at least one of neighboring chroma pixels is less than the intensity of the current chroma pixel a relationship between the current chroma pixel and the neighboring chroma pixels belongs and applying an edge offset to the current chroma pixel depending on the determination result, and the value of the edge offset may be determined on the basis of the information received in the step of receiving information.

(20) In the video information decoding method according to (16), the information received in the step of receiving information may indicate which of information on luma, information on chroma, and information on both luma and chroma the information is.

Advantageous Effects

According to the invention, it is possible to enhance a video reconstruction effect by adaptively applying an SAO.

According to the invention, it is possible to enhance a video reconstruction effect by applying an SAO in consideration of an occurrence frequency of a pixel by intensity.

According to the invention, it is possible to reduce an amount of information to be transmitted by applying an SAO to only an effective band and transmitting relevant information from an encoder to a decoder.

According to the invention, it is possible to enhance a picture reconstruction effect by applying plural SAOs depending on an SAO application unit.

According to the invention, it is possible to enhance a picture reconstruction effect by applying an SAO on chroma pixels.

According to the invention, it is possible to enhance a picture reconstruction effect by applying an SAO to chroma pixels in consideration of characteristics of the chroma pixels.

DESCRIPTION OF EXEMPLARY EMBODIMENTS

Figure 1:
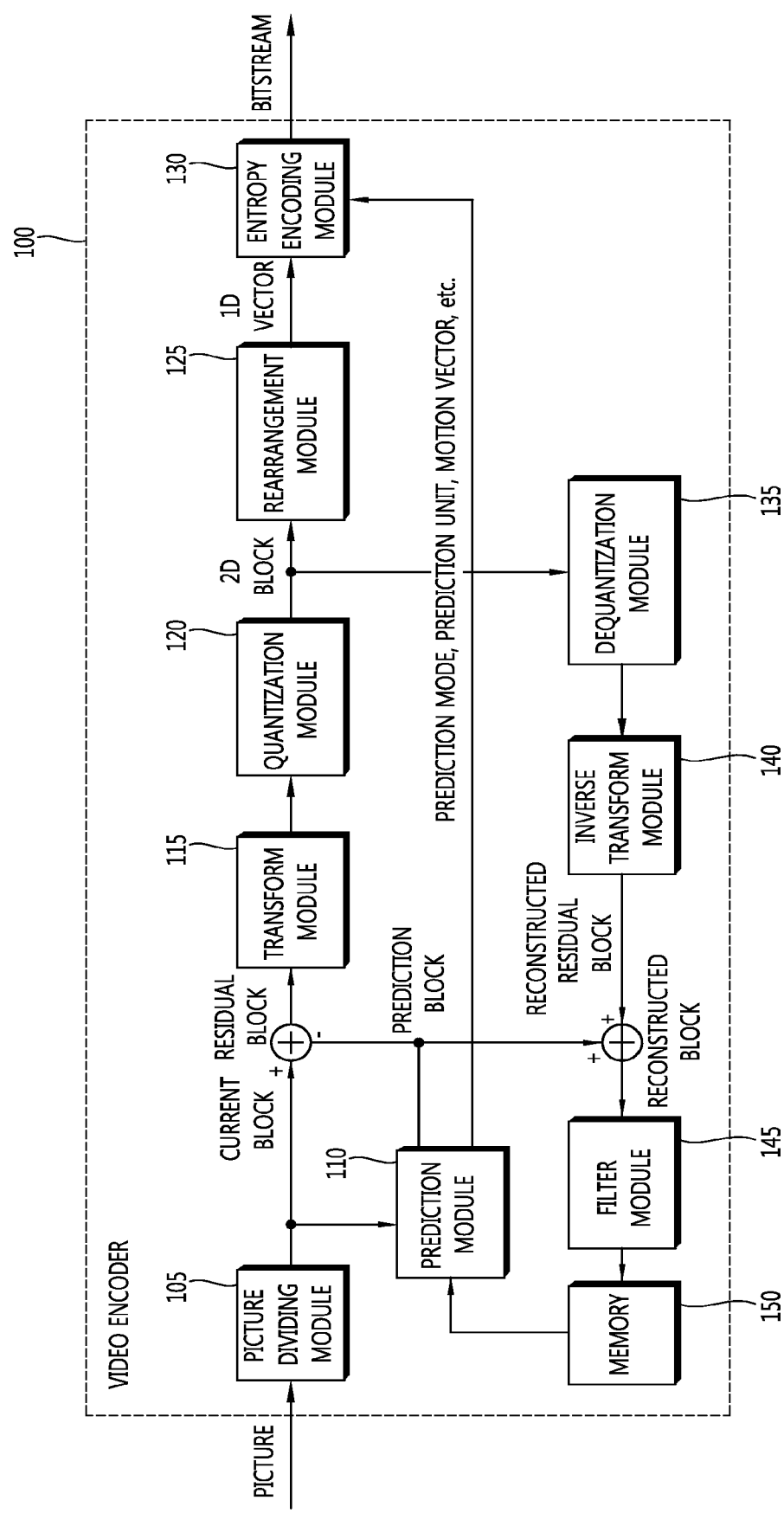
FIG. 1 is a block diagram schematically illustrating a video encoding apparatus (encoder) according to an embodiment of the invention.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in a video encoder and a video decoder, and do not mean that the elements are embodied by independent hardware or independent software. For example, two or more elements out of the elements may be combined to form a single element, or one element may be divided into plural elements. Embodiments in which the elements are combined and/or divided belong to the scope of the invention without departing from the concept of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoding apparatus (encoder) according to an embodiment of the invention. Referring to FIG. 1, a video encoder 100 includes a picture dividing module 105, a prediction module 110, a transform module 115, a quantization module 120, a rearrangement module 125, an entropy encoding module 130, a dequantization module 135, an inverse transform module 140, a filter module 145, and a memory 150.

The picture dividing module 105 can divide an input picture into at least one process unit. Here, the process unit may be a prediction unit (hereinafter, referred to as a "PU"), a transform unit (hereinafter, referred to as a "TU"), or a coding unit (hereinafter, referred to as a "CU").

The prediction module 110 includes an inter prediction module that performs an inter prediction process and an intra prediction module that performs an intra prediction process, as will be described later. The prediction module 110 predicts the process unit of the picture divided by the picture dividing module 105 to generate a prediction block. The process unit of a picture in the prediction module 110 may be a CU, a TU, or a PU. It may be determined whether the prediction performed on the corresponding process unit is inter prediction or intra prediction, and specific details (for example, a prediction mode) of the prediction methods may be determined. The process unit subjected to the prediction process may be different from the process unit of which the prediction method and the specific details are determined. For example, the prediction method and the prediction mode may be determined by the PU units and the prediction process may be performed by the TU units.

In the inter prediction, a prediction process is performed on the basis of information on at least one of a previous picture and/or a subsequent picture of a current picture to generate a prediction block. In the intra prediction, a prediction process is performed on the basis of pixel information of a current picture to generate a prediction block.

In the inter prediction, a reference picture is selected for a PU, and a reference block having the same size as the PU is selected. Then, a prediction block is generated so that a residual signal from the current PU is minimized and the magnitude of a motion vector is minimized. On the other hand, a skip mode, a merge mode, an MVP (Motion Vector Prediction), or the like can be used as the intra prediction method. The prediction block may be generated in the unit of pixel samples less than an integer pixel, such as ½ pixel samples and ¼ pixel samples. Here, a motion vector can also be expressed in the unit of pixel samples less than an integer pixel. For example, luma pixels can be expressed in the unit of ¼ pixels and chroma pixels can be expressed in the unit of ⅛ pixels.

Information such as an index of a reference picture selected through the inter prediction, a motion vector (for example, a motion vector predictor), and a residual signal is entropy-encoded and is transmitted to a decoder.

When the intra prediction is performed, a prediction mode may be determined in the unit of PUs and the prediction process may be performed in the unit of PUs. Alternatively, a prediction mode may be determined in the unit of PUs and the inter prediction may be performed in the unit of TUs.

The prediction modes in the intra prediction include 33 directional prediction modes and at least two non-directional modes. The non-directional modes include a DC prediction mode and a planar mode.

In the intra prediction, a prediction block may be generated after a filter is applied to reference samples. At this time, it may be determined whether a filter should be applied to reference samples, depending on the intra prediction mode and/or the size of a current block.

A PU may have various sizes/shapes. For example, in case of the inter prediction, a PU may have sizes such as 2N×2N, 2N×N, N×2N, and N×N. In case of the intra prediction, a PU may have sizes such as 2N×2N and N×N (where N is an integer). The PU having a size of N×N may be set to be used in only a specific case. For example, the PU having a size of N×N may be set to be used for only a coding unit having the smallest size or may be set to be used for only the intra prediction. In addition to the PUs having the above-mentioned sizes, PUs having sizes such as N×mN, mN×N, 2N×mN, and mN×2N (where m<1) may be additionally defined and used.

Residual values (a residual block or a residual signal) between the generated prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block by transform units and generates transform coefficients. The transform unit in the transform module 115 may be a TU and may have a quad tree structure. The size of the transform unit may be determined within a predetermined range of largest and smallest sizes. The transform module 115 may transform the residual block using a DCT (Discrete Cosine Transform) and/or a DST (Discrete Sine Transform).

The quantization module 120 may quantize the residual values transformed by the transform module 115 and may generate quantization coefficients. The values calculated by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the coding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the order of coefficient scanning on the basis of stochastic statistics of the coefficients transmitted from the quantization module.

The entropy encoding module 130 may perform an entropy encoding process on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a coding unit, prediction mode information, division unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntax to be transmitted, if necessary.

The dequantization module 135 dequantizes the values quantized by the quantization module 120. The inverse transform module 140 inversely transforms the values dequantized by the dequantization module 135. The residual values generated by the dequantization module 135 and the inverse transform module 140 may be merged with the prediction block predicted by the prediction module 110 to generate a reconstructed block.

The filter module 145 applies a deblocking filter, an ALF (Adaptive Loop Filter), an SAO (Sample Adaptive Offset) to the reconstructed picture.

The deblocking filter remove a block distortion generated at the boundary between blocks in the reconstructed picture. The ALF performs a filtering process on the basis of the resultant values of comparison of the original picture with the reconstructed picture of which the blocks have been filtered by the deblocking filter. The ALF may be applied only when high efficiency is necessary. The SAO reconstructs offset differences between the residual blocks having the deblocking filter applied thereto and the original picture by pixels and is applied in the form of a band offset, an edge offset, or the like.

On the other hand, the filter module 145 may not perform a filtering process on the reconstructed block used for the inter prediction.

The memory 150 stores the reconstructed block or picture calculated by the filter module 145. The reconstructed block or picture stored in the memory 150 is supplied to the prediction module 110 that performs the inter prediction.

Figure 2:
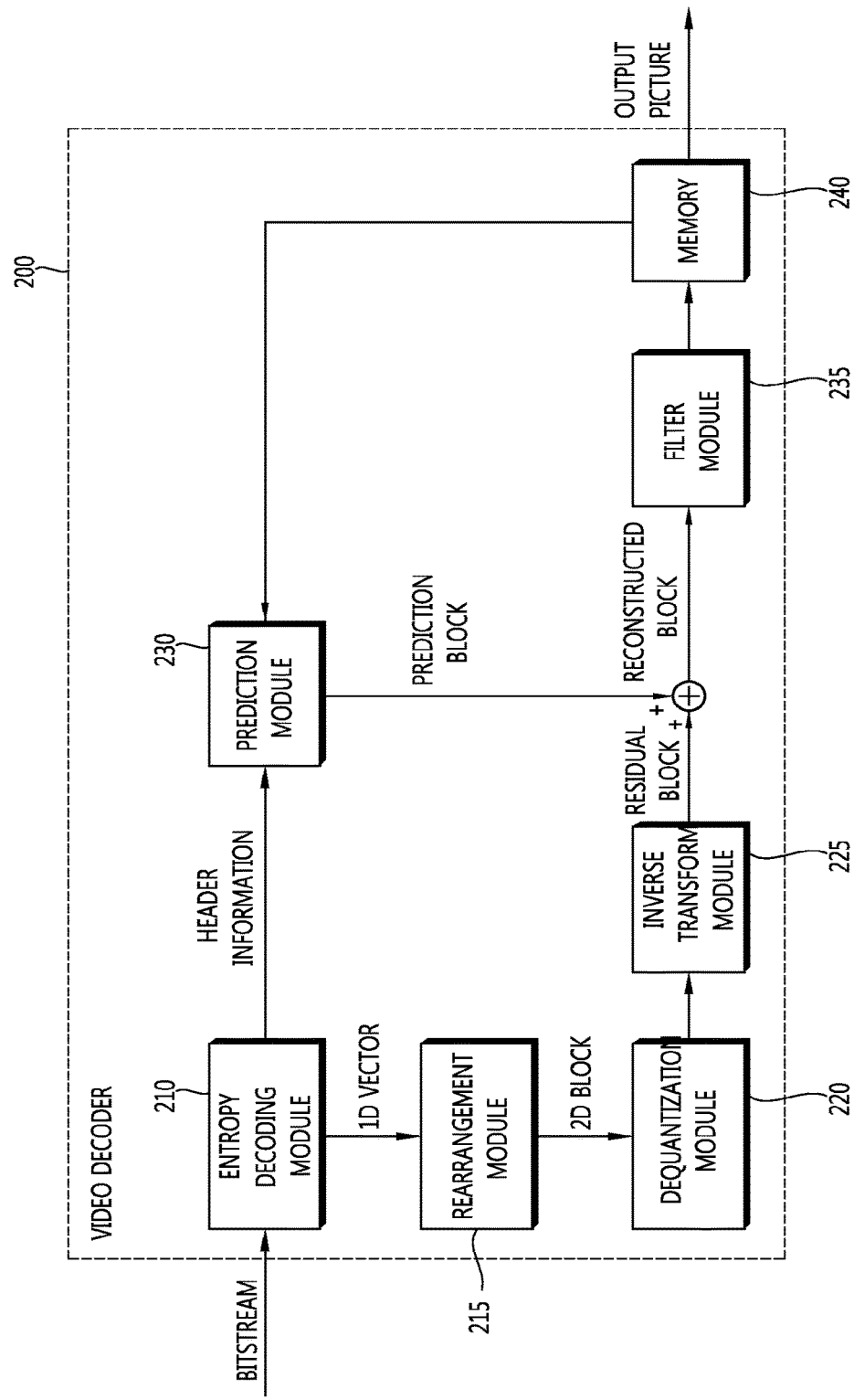
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 includes an entropy decoding module 210, a rearrangement module 215, a dequantization module 220, an inverse transform module 225, a prediction module 230, a filter module 235, and a memory 240.

When a video bitstream is input from the video encoder, the input bitstream is decoded on the basis of the order in which video information is processed by the video encoder.

For example, when the video encoder uses a variable length coding (hereinafter, referred to as "VLC") method such as the CAVLC method to perform the entropy encoding process, the entropy decoding module 210 may implement the same VLC table as the VLC table used in the video encoder and may perform the entropy decoding process. When the video encoder uses the CABAC method to perform the entropy encoding process, the entropy decoding module 210 may perform the entropy decoding process using the CABAC method to correspond thereto.

Information for generating a prediction block out of the information decoded by the entropy decoding module 210 is supplied to the prediction module 230, and the residual values entropy-decoded by the entropy decoding module are input to the rearrangement module 215.

The rearrangement module 215 rearranges the bitstream entropy-decoded by the entropy decoding module 210 on the basis of the rearrangement method in the video encoder. The rearrangement module 215 reconstructs and rearranges coefficients expressed in the form of a one-dimensional vector into coefficients in the form of a two-dimensional block. The rearrangement module 215 may be supplied with information associated with the coefficient scanning performed by the encoder and may perform the rearrangement using a method of inversely scanning the coefficients on the basis of the scanning order in which the scanning is performed by the encoder.

The dequantization module 220 may perform dequantization on the basis of the quantization parameters supplied from the encoder and the coefficient values of the rearranged block.

The inverse transform module 225 may perform the inverse DCT and/or inverse DST of the DCT and DST, which has been performed by the transform module of the encoder, on the quantization result from the video encoder. The inverse transform may be performed on the basis of a transfer unit or a division unit of a picture determined by the encoder. The transform module of the encoder may selectively perform the DCT and/or DST depending on plural information pieces such as the prediction method, the size of a current block, and the prediction direction, and the inverse transform module 225 of the decoder may perform the inverse transform on the basis of the transform information on the transform performed by the transform module of the encoder.

The prediction module 230 may generate a prediction block on the basis of prediction block generation information supplied from the entropy decoding module 210 and the previously-decoded block and/or picture information supplied from the memory 240. The reconstructed block may be generated using the prediction block generated by the prediction module 230 and the residual block supplied from the inverse transform module 225. When the prediction mode of a current PU is an intra prediction mode, an intra prediction process of generating a prediction block on the basis of pixel information of a current picture may be performed.

When the prediction mode for a current block is the inter prediction mode, the inter prediction process on the current PU may be performed on the basis of information included in at least one of a previous picture and a subsequent picture of the current picture is used as a reference picture. At this time, motion information necessary for the inter prediction of the current PU, for example, information on motion vectors, reference picture indices, and the like, can be derived from a skip flag, a merge flag, and the like received from the encoder.

The reconstructed block and/or picture may be supplied to the filter module 235. The filter module 235 performs a deblocking filtering process, an SAO (Sample Adaptive Offset) process, and/or an adaptive loop filtering process on the reconstructed block and/or picture.

The memory 240 may store the reconstructed picture or block for use as a reference picture or a reference block and may supply the reconstructed picture to an output module.

On the other hand, the filter modules of the encoder and the decoder may apply the deblocking filter, the SAO (Sample Adaptive Offset), and the ALF (Adaptive Loop Filter) as an in-loop filter, as described above.

The deblocking filter removes artifacts between blocks due to prediction, transform, and quantization in the unit of blocks. The deblocking filter is applied to a prediction unit edge or a transform unit edge and may set a predetermined smallest block size for application of the deblocking filter.

A boundary strength (BS) of a horizontal or vertical filter boundary is first determined to apply the deblocking filter. It is determined in the unit of blocks whether to perform a filtering process on the basis of the BS. When it is determined that the filtering process should be performed, a filter to be applied is determined. The filter to be applied may be selected from weak filters and strong filters. The filtering module applies the selected filter to the boundary of the corresponding block.

The SAO is a process of reconstructing an offset difference between a picture subjected to the deblocking filtering process and the original picture in the unit of pixels. The SAO serves to compensate for a coding error. Here, the coding error may be based on quantization or the like.

As described above, the SAO is classified into two types of a band offset and an edge offset.

Figure 3:
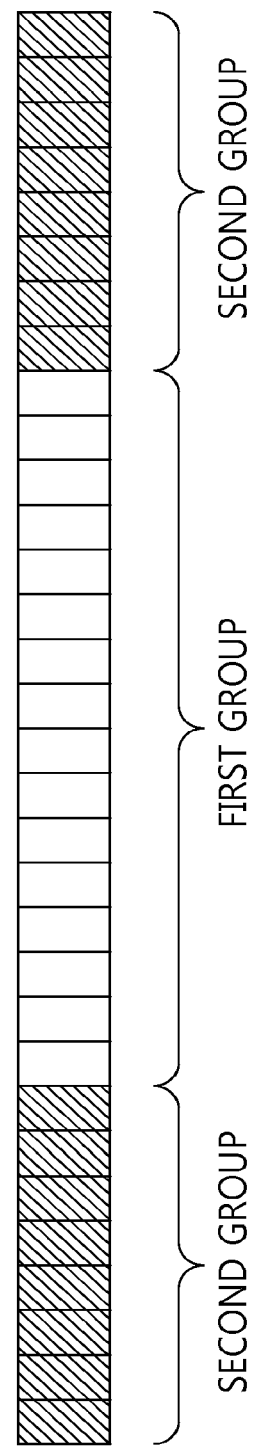
FIG. 3 is a diagram schematically illustrating a band offset.

FIG. 3 is a diagram schematically illustrating the band offset.

In order to apply the band offset, pixels in an SAO application unit are classified depending on intensities of the pixels. The entire intensity range may be divided into a predetermined number of intensity intervals, that is, bands. Each band includes pixels having intensities in the corresponding intensity interval. The offset to be applied may be determined for each band.

In case of a picture including N-bit pixels, the number of intensity intervals ranges from 0 to $2^N-1$. For example, 8-bit pixels are classified into 0 to 255 intensity intervals. FIG. 3 illustrates an example where the entire intensity range is divided into 32 bands having the same intensity gap.

Referring to FIG. 3, the intensity intervals of the bands are 8. The 32 bands may be divided into a first group at the center and a second group neighboring the first group. The first group includes 16 bands and the second group includes 16 bands. The offset may be applied to each band and the offset value for each band may be applied to the decoder.

In the decoder, pixels are grouped and the offset value transmitted for each band is applied to the groups.

The ALF compensates for a coding error using a Wiener filter. The ALF is globally applied to a slice unlike the SAO. The ALF may be applied after the SAO is applied, or may be applied only when HE (High Efficiency) is necessary. Information (such as a filter coefficient, ON/OFF information, and a filter shape) for applying the ALF may be transmitted to the decoder through the use of a slice header. Various shapes such as a two-dimensional diamond shape and a two-dimensional cross shape may be used as the shape of the filter used for the ALF.

On the other hand, it may be considered that the SAO is adaptively applied depending on the region to which the SAO is applied, that is, the SAO application unit. Hereinafter, a method of performing an adaptive SAO in the system according to the invention will be described by the band offset and the edge offset.

<Adaptive Application of Band Offset>

Figure 4:
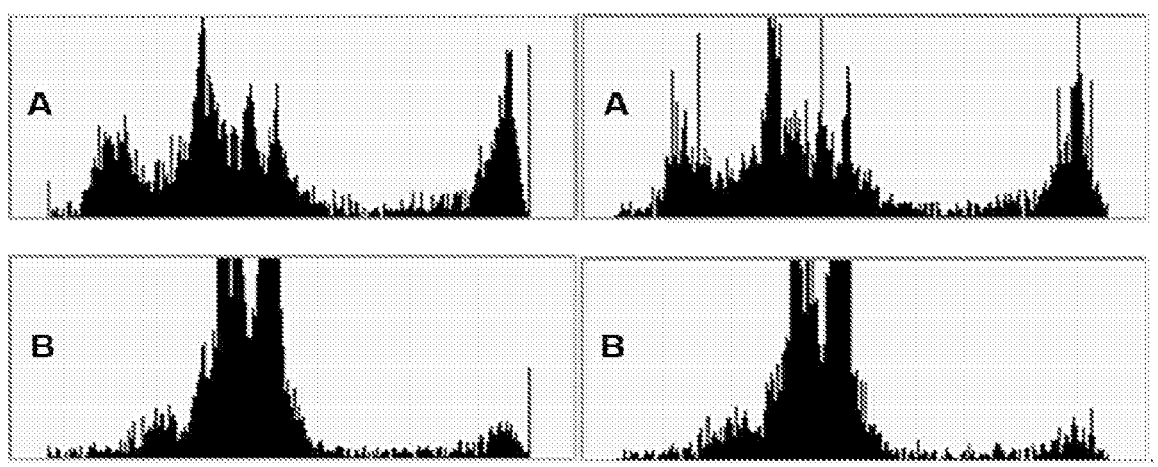
FIG. 4 is a diagram illustrating an example of histograms based on characteristics of a predetermined picture.

FIG. 4 is a diagram illustrating an example of histograms based on characteristics of a predetermined picture. Specifically, FIG. 4 illustrates histograms based on luma characteristics as in FIG. 11(b).

Referring to FIG. 4, it can be seen that a histogram has various distributions depending on the characteristics of a picture. Therefore, a pixel range may be adaptively divided and the band offset may be applied thereto. That is, a method of adaptively setting bands of an intensity range of pixels and applying an offset may be considered.

For example, when histograms of a picture of a corresponding block are concentrated on the central part in the entire intensity range, a method of dividing the central part more densely to set the bands and dividing the side parts less densely to set the bands may be considered. Specifically, when pixels of N bits are concentrated on the central part in the entire intensity range (0 to $2^N-1$), M bands having small intensity intervals may be set in the central part and L bands having large intensity intervals may be set in the side part.

On the contrary, when histograms of a picture of the corresponding block are concentrated on the side parts in the entire intensity range, a method of dividing the side parts more densely to set the bands and dividing the central part less densely to set the bands may be considered. Specifically, when pixels of N bits are concentrated on the side parts in the entire intensity range (0 to $2^N-1$), M bands having small intensity intervals may be set in the side parts and L bands having large intensity intervals may be set in the central part.

Figure 5:
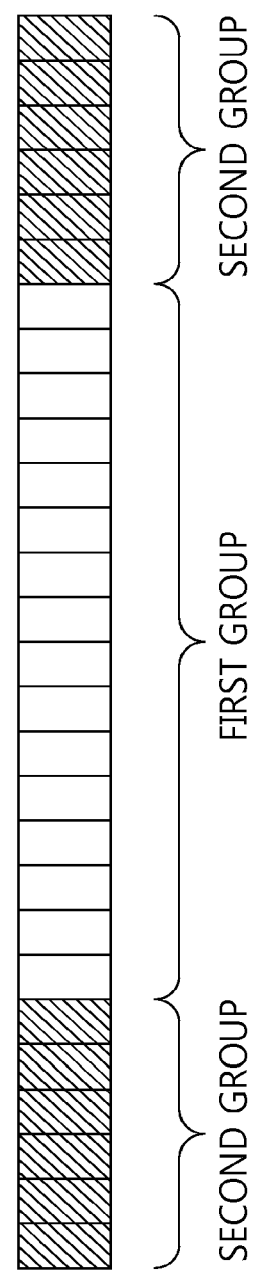
FIG. 5 is a diagram schematically illustrating an example of a method of adaptively dividing intensities of all pixels and applying a band offset thereto.

FIG. 5 is a diagram schematically illustrating an example of a method of adaptively dividing an intensity range of the total pixels and applying the band offset thereto. FIG. 5 illustrates an example where pixels are concentrated on the central part.

In the example illustrated in FIG. 5, when the pixel value range, that is, the pixel intensity range have 256 (0 to $2^8-1$) pixel values, the first group in the central part may be densely divided into 16 bands by 4 pixel values (for example, four intensity intervals) and the second group in the side parts may be roughly divided into 12 bands by 16 pixel values.

When histograms of the picture of the corresponding block are concentrated on the side parts in the entire intensity range, the first group in the central part is divided into 12 bands by 16 pixel values and the second group in the side parts may be divided into 16 bands by 4 pixel values.

On the other hand, a method of classifying the entire intensity range into more band groups than two band groups depending on the SAO application unit may be considered.

By classifying the entire intensity range into more bands groups and applying the offset thereto, it is possible to enhance an effect of picture reconstruction. For example, the bands may be classified into N groups instead of two groups and a finer offset may be applied to some pixel value ranges.

Figure 6:
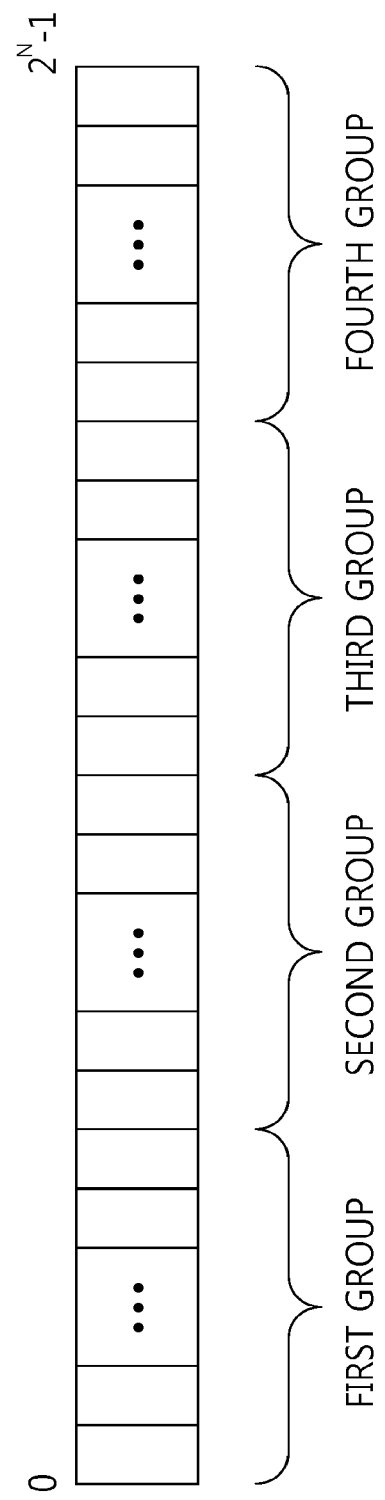
FIG. 6 is a diagram schematically illustrating another example of the method of adaptively dividing intensities of all pixels and applying a band offset thereto.

FIG. 6 is a diagram schematically illustrating an example of the method of adaptively dividing the entire intensity range of all pixels and applying a band offset thereto.

FIG. 6 illustrates an example where the entire intensity range is divided into bands, the bands are classified into four groups, and the band offset is applied thereto. As illustrated in FIG. 6, by dividing the entire intensity range into more groups than two groups and transmitting offset information for each group, it is possible to better reflect local characteristics of a picture.

On the other hand, when the pixel value range covered by each group, that is, the intensity section, is fixed at the time of applying the band offset, relevant information is transmitted even when the occurrence frequency of a specific band in the group is small or the band offset value of the corresponding band is 0. Therefore, in order to prevent this problem, the encoder may transmit the range of the band offset applied to a current picture. For example, the encoder may transmit information on what bit depth section, that is, what intensity section, in the current picture is subjected to the band offset to the decoder.

When the offsets of a current picture mainly occur in a specific pixel value (for example, intensity) range and a band offset is applied to bands with uniform intervals, it is possible to prevent transmission of unnecessary offset information or performing of an unnecessary offset by designating a band in which application of the band offset is started and a band in which application of the band offset is ended.

When a pixel value (for example, intensity) range in which an offset mainly occurs and to which a band offset should be applied in a current picture ranges from 32 to 160 and the size of each band in the pixel value (for example, intensity) range of 0 to 256 is 8, the encoder may transmit information such as band_start and band_end indicating a band in which application of the band offset is started and a band in which application of the band offset is ended out of total 32 bands to the decoder. When application of the band offset is started in the fourth band out of the total bands and the application of the band offset is ended in the twentieth band, information such as band_start=4 and band_end=20 may be transmitted.

The occurrence frequency of a pixel value belonging to each band, that is, the occurrence frequency of each band, may be counted and the offset value of the band offset of only a band having the occurrence frequency of the pixel value may be transmitted.

For example, when bands having high occurrence frequencies out of 32 bands 0 to 31 are 0, 4, 5, 6, 7, 9, 12, 15, 19, 20, 23, and 25, the encoder may transmit offset values in the band offset to be applied to only the bands having high occurrence frequencies to the decoder and may not transmit offset values in the band offset to be applied to the bands having low occurrence frequencies.

In this case, the encoder may additionally transmit information on what bands the offset values are applied to the decoder.

As a second type of SAO, there is an edge offset considering edge information for each pixel. The edge offset is applied in consideration of an edge direction with respect to a current pixel and intensities of the current pixel and neighboring pixels.

Figure 7:
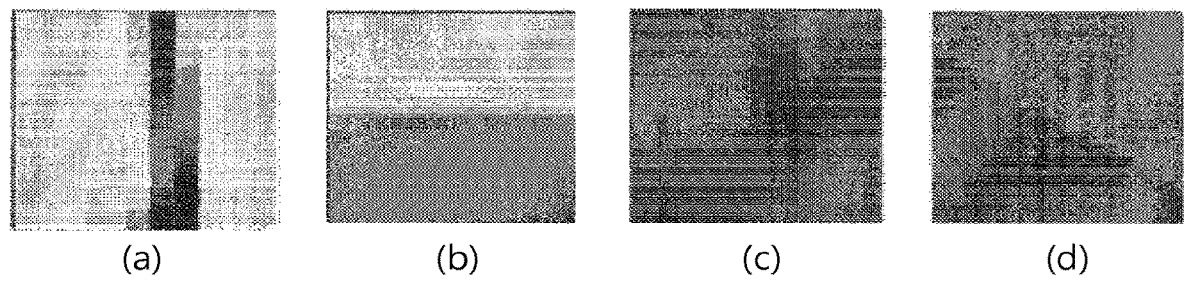
FIG. 7 is a diagram illustrating examples of representative forms of edges which can occur in a block by directions.

FIG. 7 is a diagram illustrating examples of representative forms of edges which can occur in a block by directions. Referring to FIG. 7, FIGS. 7(a) to 7(d) illustrate an edge having a direction of 0 degrees, an edge having a direction of 90 degrees, an edge having a direction of 135 degrees, and an edge having a direction of 45 degrees, respectively. Therefore, four types for a single filtering unit, that is, an SAO application unit (of which the smallest unit is a LCU) may be used as the edge offset depending on the angles or directions of the edges. For the purpose of convenience of explanation, four edge types of the SAO application unit illustrated in FIG. 7 are referred to as edge types of the edge offset.

Figure 8:
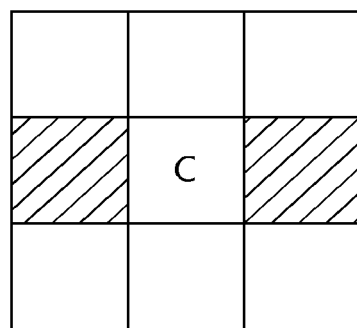
FIG. 8 is a diagram illustrating four representative edge types of an edge offset with respect to a current pixel (C).
Figure 8:
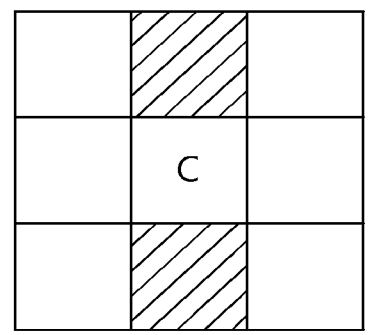
Figure 8:
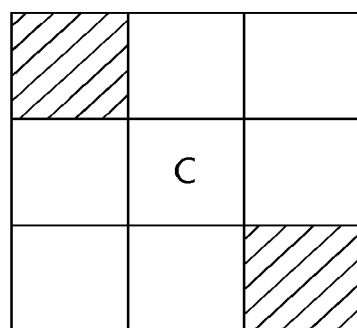
Figure 8:
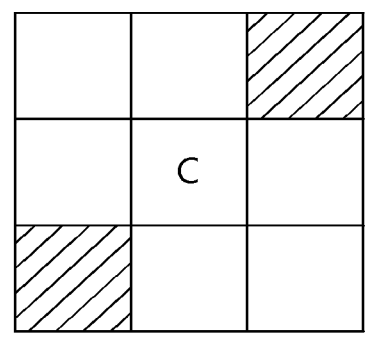

FIG. 8 is a diagram illustrating four representative edge types of the edge offset with respect to a current pixel (C). In FIG. 8, FIG. 8(a) illustrates an edge of 0 degrees in one dimension, FIG. 8(b) illustrates an edge of 90 degrees in one dimension, FIG. 8(c) illustrates an edge of 135 degrees in one dimension, and FIG. 8(d) illustrates an edge of 45 degrees in one dimension. Four edge types may be used depending on the edge types of the four directions illustrated in FIG. 8. An offset corresponding to one of the four edge types may be applied to each SAO application unit.

After the edge type is determined, the relationship between a current pixel and neighboring pixels may be considered to apply an edge offset.

Figure 9:
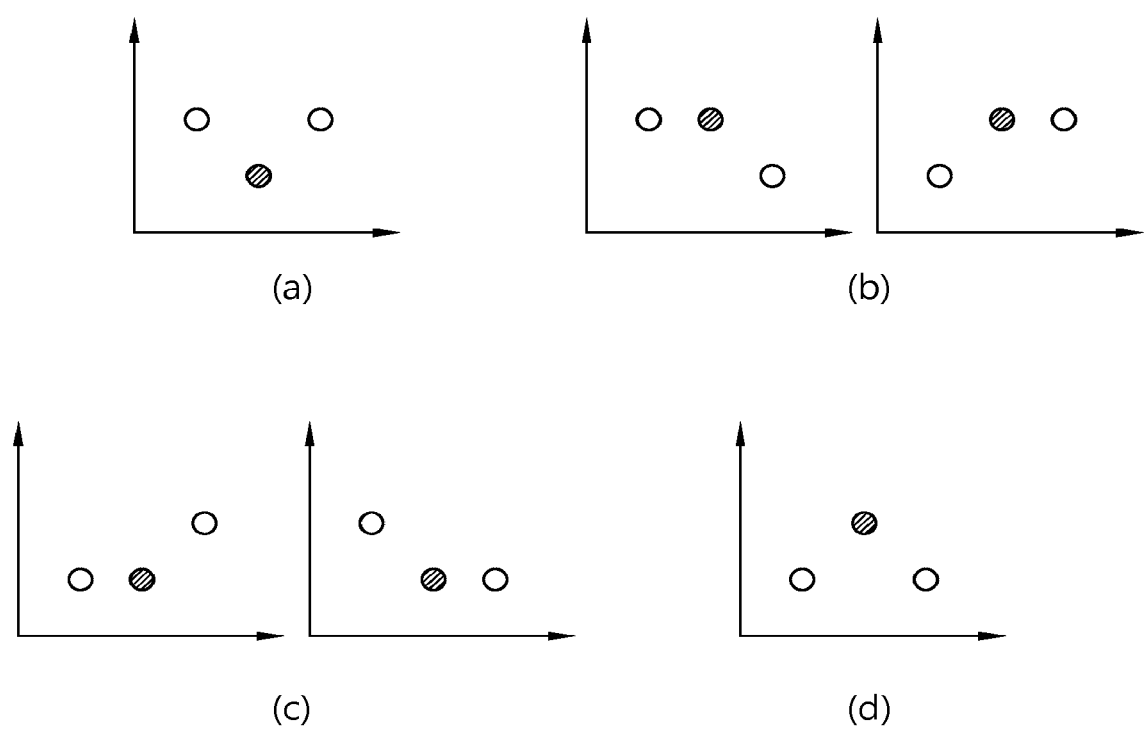
FIG. 9 is a diagram schematically illustrating an example where a current pixel is compared in intensity with neighboring pixels and the intensities are grouped into four categories.

FIG. 9 is a diagram schematically illustrating an example where a current pixel is compared in intensity with neighboring pixels and the intensities are grouped into four categories. Referring to FIG. 9, FIGS. 9(a) to 9(d) illustrate distributions of a current pixel (C) and neighboring pixels for each category. The category illustrated in FIG. 9(a) indicates a case where intensities of two neighboring pixels are greater than that of the current pixel (C). The category illustrated in FIG. 9(b) indicates a case where the intensity of one pixel of two neighboring pixels of the current pixel is smaller than that of the current pixel. The category illustrated in FIG. 9(c) indicates a case where the intensity of one pixel of two neighboring pixels of the current pixel is greater than that of the current pixel. The category illustrated in FIG. 9(d) indicates a case where intensities of two neighboring pixels of the current pixel are greater than that of the current pixel.

For example, FIGS. 9(a) and 9(b) illustrate cases where the intensity of the current pixel is greater or smaller than those of the neighboring pixels. FIGS. 9(b) and 9(d) may appear when the current pixel is located at a boundary of a predetermined region.

Table 1 schematically shows four categories illustrated in FIG. 9.

TABLE 1

| Category | Condition |
|---|---|
| 1 | Intensity of C < Intensities of two neighboring pixels |
| 2 | Intensity of C < Intensity of one neighboring pixel and intensity of C = Intensity of one neighboring pixel |
| 3 | Intensity of C > Intensity of one neighboring pixel and intensity of C = Intensity of one neighboring pixel |
| 4 | Intensity of C > Intensities of two neighboring pixels |
| 0 | No correspondence |

In Table 1, C represents a current pixel. Category 1 in Table 1 corresponds to FIG. 9(a), Category 2 in Table 1 corresponds to FIG. 9(b), Category 3 in Table 1 corresponds to FIG. 9(c), and Category 4 in Table 1 corresponds to FIG. 9(d).

The encoder transmits an edge offset value for each category. The decoder may add the edge offset value corresponding to a category to the edge type of the pixels to reconstruct the pixels. For example, after it is determined what of four edge types illustrated in FIG. 7 the current pixel belongs to, the category of the categories shown in Table 1 to which the current pixel belongs may be determined and the offset of the corresponding category may be applied to the current pixel.

On the other hand, filtering units, that is, SAO application units, are units having a size equal to or larger than the LCU (Largest Coding Unit) and are units aligned with the boundary of the LCUs.

A unit to which the SAO is applied is a region obtained by dividing one picture in a quad tree structure. The encoder may determine whether to apply the SAO, the offset type, and the offset values for each SAO application unit and may transmit the determined information to the decoder. Here, determining of the offset type means that which of plural band offsets and plural edge offsets to apply is determined.

Figure 10:
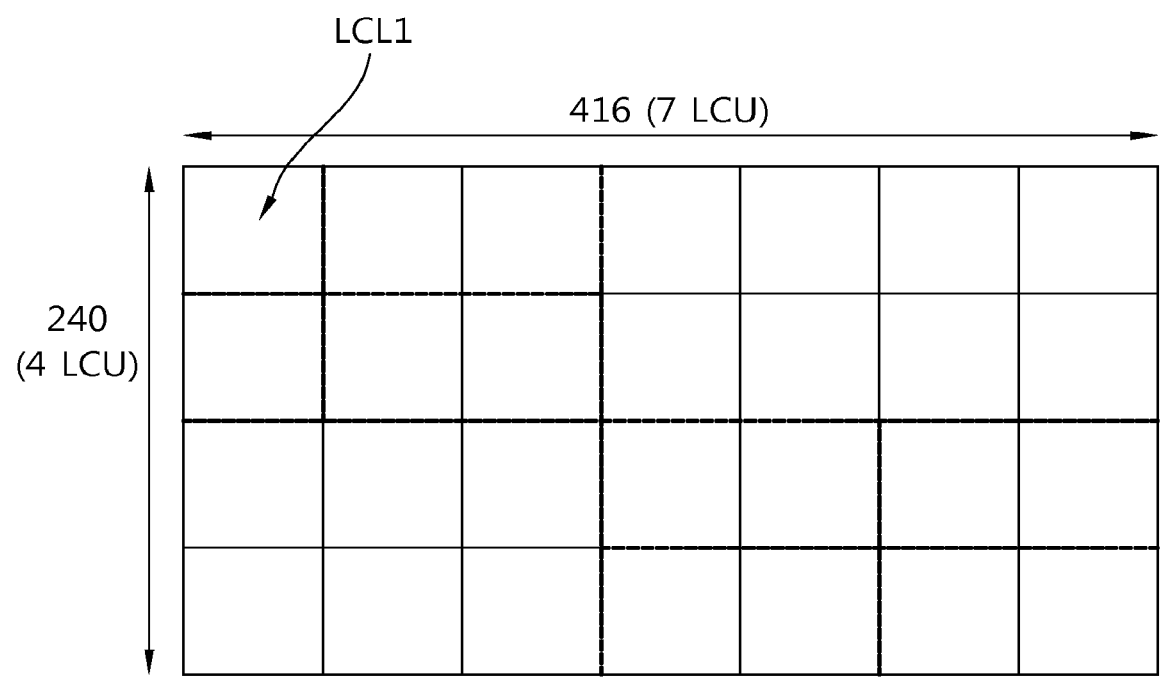
FIG. 10 is a diagram schematically illustrating an SAO application unit as a region to which an SAO is applied.

FIG. 10 is a diagram schematically illustrating the SAO application units. FIG. 10 illustrates the SAO application units obtained by dividing a WQVGA (416×240) picture in a quad tree structure. Each SAO application unit is larger than an LCU and may be divided along the boundaries of the LCUs.

As described above, the smallest unit of the SAO application unit is the LCU, but in case of a small picture, the size of the LCU may be an excessively large size to apply a single offset thereto. For example, when the LCU has a size of 64×64, the size of the LCU may be an excessively large size to reconstruct an original picture using only a single offset. If two or more different edges are present in a single LCU, two or more offsets may be used for the single LCU.

When plural edge offsets are applied to a single SAO application unit, plural edges types out of FIGS. 8(a) to 8(d) may be selected and applied depending on the directions of the edges in the region.

<SAO Syntax Structure>

Table 2 schematically shows an example of a sequence parameter set syntax as a syntax structure for applying the SAO.

TABLE 2

|  | C | Descriptor |
|---|---|---|
| seq_parameter_set_rbsp( ) { | | |
| ... | | |
| sao_used_flag | 1 | u(1) |
| ... | | |
| } | | |

Table 2 shows an example of information indicating whether the SAO is applied to a current sequence. For example, when the value of sao_used_flag in the syntax shown in Table 2 is 0, it means that the SAO cannot be used (disabled) for the current sequence. When the value of sao_used_flag is 1, it means that the SAO can be used (enabled) for the current sequence.

Table 3 schematically shows an example of a slice header syntax as a syntax structure for applying the SAO.

TABLE 3

|  | C | Descriptor |
|---|---|---|
| slice_header( ) { | | |
| ... | | |
| sao_param( ) | 2 | |
| } | | |

An SAO parameter (sao_param( ) for applying the SAO may be indicated by the slice header syntax shown in Table 3.

Table 4 schematically shows an example of an SAO parameter syntax as a syntax structure for applying the SAO.

TABLE 4

|  | C | Descriptor |
|---|---|---|
| sao_param( ) { | | |
| sao_flag | 2 | u(1)\|ae(v) |
| if( sao_flag ) { | | |
| sao_split_param( 0, 0, 0 ) | | |
| sao_offset_param( 0, 0, 0 ) | | |
| } | | |
| } | | |

When an SAO parameter is indicated using the slice header syntax, parameters necessary for applying the SAO are transmitted over the SAO parameter syntax. The parameters to be transmitted include sao_split_param related to division of the SAO application region and sao_offset_param related to an offset to be applied in the SAO, as in the example shown in Table 4.

In the example shown in Table 4, when the value of sao_flag is 1, it means that the SAO can be applied (enabled) to at least a part of a current picture. When the value of sao_flag is 0, it means that the SAO cannot be applied (disabled) to the entire current picture. Therefore, when the value of sao_flag is 1, the SAO parameters may be indicated.

Table 5 schematically shows an example of a sao_split_param related to division out of the SAO parameters as a syntax structure for applying the SAO.

TABLE 5

|  | C | Descriptor |
|---|---|---|
| sao_split_param( x, y, Depth ) { | | |
| if( Depth < MaxSplitLevel ) | | |
| split_flag[ Depth ][ y ][ x ] = sao_split_flag | 2 | u(1)\|ae(v) |
| else | | |
| split_flag[ Depth ][ y ][ x ] = 0 | | |
| if( split_flag[ Depth ][ y ][ x ] ) { | | |
| pqao_split_param( x + 0, y + 0, Depth + 1 ) | | |
| pqao_split_param( x + 1, y + 0, Depth + 1 ) | | |
| pqao_split_param( x + 0, y + 1, Depth + 1 ) | | |
| pqao_split_param( x + 1, y + 1, Depth + 1 ) | | |
| } | | |
| } | | |

In the example shown in Table 5, sao_split_param(x, y, Depth) indicates whether to additionally divide the SAO application unit at the position designated by (x, y) and the depth designated by "Depth". When the value of sao_split_param is 0, it means that a current region is a leaf. Therefore, the current region is not divided any more for application of the SAO. When the value of sao_split_param is 1, it means that the current region can be additionally divided into four child regions. When the SAO application region is divided, division parameters (pqao_split-param) for four divided regions may be indicated.

When sao_split_param(x, y, Depth) indicates that the SAO application unit should be additionally divided, pqao_split-param indicates whether to additionally divide the SAO application unit for each divided region. In that whether to divide the SAO application unit at the corresponding depth is indicated, the syntax sao_split_param may be used again for the divided regions instead of the syntax pqao_split-param, where the depth of the indicated region may be changed. For example, when the region of which division will be indicated and the depth thereof are (x0, y0, saoDepth) in indicating whether to divide a region for applying the SAO and sao_split_param(x0, y0, saoDepth) indicates that the corresponding region (x0, y0) should be divided, the depth may be adjusted to "saoDepth+1" and whether to divide the divided regions (x0+0, y0+0), (x0+0, y0+1), (x0+1, y0+0), and (x0+1, y0+1) may be indicated again.

Table 6 schematically shows an example of a syntax structure for applying sao_split_param to the divided regions again.

TABLE 6

```
sao_offset_param( x0, y0, saoDepth ) {
    if( sao_split_flag[ saoDepth ][ x0 ][ y0 ] ) {
        sao_offset_param( x0 + 0, y0 + 0, saoDepth + 1 )
        sao_offset_param( x0 + 1, y0 + 0, saoDepth + 1 )
        sao_offset_param( x0 + 0, y0 + 1, saoDepth + 1 )
        sao_offset_param( x0 + 1, y0 + 1, saoDepth + 1 )
    } else {
        sao_type_idx[ saoDepth ][ x0 ][ y0 ]
        if( sao_type_idx[ saoDepth ][ x0 ][ y0 ] != 0 )
            for( i = 0; i < NumSaoClass; i++ )
                sao_offset[ saoDepth ][ x0 ][ y0 ][ i ]
    }
}
```

In Table 6, NumSaoClass indicates the number of SAO categories or SAO offsets.

Table 7 schematically shows an example of the syntax sao_offset_param related to an offset out of the SAO parameters as a syntax structure for applying the SAO.

TABLE 7

| | C | Descriptor |
|---|---|---|
| sao_offset_param ( x, y, Depth ) { | | |
|   if( split_flag[ Depth ][ y ][ x ] ) { | | |
|     sao_offset_param ( x + 0, y + 0, Depth + 1 ) | | |
|     sao_offset_param ( x + 1, y + 0, Depth + 1 ) | | |
|     sao_offset_param ( x + 0, y + 1, Depth + 1 ) | | |
|     sao_offset_param ( x + 1, y + 1, Depth + 1 ) | | |
|   } else { | | |
|     type_idx[ Depth ][ y ][ x ] = sao_type_idx | 2 | ue(v)\|ae(v) |
|     if( sao_type_idx != 0 ) { | | |
|       if( sao_type_idx > 4 ) { // offset type is bandoffset | | |
|         start_offset | | |
|         end_offset | | |
|       } else { | | |
|         start_offset = 0 | | |
|         end_offset = PqaoOffsetNum[sao_type_idx] | | |
|       } | | |
|       for( i = start_offset; i < end_offset; i++ ) | | |
|         offset[ Depth ] [ y ] [ x ] [ i ] = sao_offset | 2 | se(v)\|ae(v) |
|     } | | |
|   } | | |
| } | | |

Referring to Table 7, when an SAO application region is divided, the offset parameter may be indicated for each divided region.

When an SAO application region is not divided any more, the offset type of the corresponding SAO application region is indicated.

In the example shown in Table 7, sao_type_index indicates the offset type to be applied to the current region. The number of SAO offsets or the number of SAO categories may be determined depending on the offset type (sao type, sao_type_idx) applied to the current region. An example of the syntax information indicating the number of SAO offsets or the number of SAO categories depending on the offset type is PqaoOffsetNum[sao_type_idx] shown in Table 6.

In the example shown in Table 7, start_offset indicates the smallest number of band offsets or edge offsets to be used. If start_offset is not available, it may be estimated that start_offset has a value of 0. end_offset indicates the largest number of band offsets or edge offsets to be used. When end_offset is not available, the value of end_offset may be set to the number of SAO categories (the number of offsets) PqaoOffsetNum[sao_type_idx] determined depending on the SAO type (sao_type_idx) as described above.

Table 8 schematically shows an example of an SAO offset type. As described above with reference to Table 7, the number of SAO category (the number of offsets) may be determined depending on the offset type.

TABLE 8

| SAO type index sao_type_idx | Number of SAO categories | Edge type (reference) |
|---|---|---|
| 0 | 0 | non-applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | central band |
| 6 | 16 | side band |

As shown in Table 8, the SAO type index may indicate one of the edge offsets and the band offsets. Table 8 shows an example where the total bands are divided into two groups and the band offset is applied thereto. The SAO type index indicates one of four edge offsets and two band offsets. The offset value is set depending on the category of each SOA type. For example, in case of the edge offset, the offset value may be set for each edge type by four categories corresponding to the intensities of the current pixel and the neighboring pixels.

Table 9 schematically shows an example of the SAO offset type when the band groups are adaptively divided and the band offset is applied thereto.

TABLE 9

| SAO type index (sao_type_idx) | Number of SAO categories | Edge type (reference) |
|---|---|---|
| 0 | 0 | non-applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | central band |
| 6 | 12 | side band |

In the example shown in Table 9, the number of categories varies in the central bands and the side bands. For example, in case of 256 pixels, the central band group and the side band group each including 16 bands by 8 pixel values are constructed in Table 8, but the central band group including 16 bands by 4 pixel values and the side band group including 12 bands by 15 pixel values are used to apply the band offset in Table 9. Therefore, the offset may be more densely applied to the central bands.

Table 10 schematically shows another example of the SAO offset type when the band groups are adaptively divided and the band offset is applied thereto.

TABLE 10

| SAO type index (sao_type_idx) | Number of SAO categories | Edge type (reference) |
|---|---|---|
| 0 | 0 | non-applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 12 | central band |
| 6 | 16 | side band |

Table 10 shows an example where the side band group is more densely divided and the band offset is applied thereto, unlike the example shown in Table 9. For example, in Table 10, the band offset is applied using the central band group including 12 bands by 16 pixel values and the side band group including 16 bands by 4 pixel values. Therefore, the offset may be applied more densely to the side bands.

Table 11 shows an example of a table related to the SAO type where more band groups are designated and the band offset is applied thereto.

TABLE 11

| SAO type index (sao_type_idx) | Number of SAO categories | Edge type (reference) |
|---|---|---|
| 0 | 0 | non-applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 8 | First band |
| 6 | 8 | Second band |
| 7 | 8 | Third band |
| 8 | 8 | Fourth band |

In the example shown in Table 11, each band group includes 8 bands by 8 pixel values. The band groups may be sequentially grouped from the left of the total bands as illustrated in FIG. 6.

In Table 7, the SAO type to be applied to the current pixel out of the SAO types shown in Tables 8 to 11 may be indicated by sao_type_idx. With reference to Table 7 and Tables 8 to 11, when the value of sao_type_idx is equal to or greater than 5, the band offset is applied.

Table 12 schematically shows another example of the syntax sao_offset_param related to an offset out of the SAO parameters as a syntax structure for applying the SAO.

TABLE 12

| | C | Descriptor |
|---|---|---|
| sao_offset_param ( x, y, Depth ) { | | |
| if( split_flag[ Depth ][ y ][ x ] ) { | | |
| sao_offset_param ( x + 0, y + 0, Depth + 1 ) | | |
| sao_offset_param ( x + 1, y + 0, Depth + 1 ) | | |

TABLE 12-continued

| | C | Descriptor |
|---|---|---|
| sao_offset_param ( x + 0, y + 1, Depth + 1 ) | | |
| sao_offset_param ( x + 1, y + 1, Depth + 1 ) | | |
| } else { | | |
| type_idx[ Depth ][ y ][ x ] = sao_type_idx | 2 | ue(v)\|ae(v) |
| if( sao_type_idx != 0 ) { | | |
| if( sao_type_idx > 4 ) { // offset type is bandoffset | | |
| total_offset_num_minus_one | | |
| for( i=0; i<total_offset_num_minus_one +1; i++) { | | |
| offset_idx[i] | | |
| offset[ Depth ][ y ][ x ][ offset_idx[i] ] = sao_offset | | |
| } | | |
| } else { | | |
| for( i = 0; i < PqaoOffsetNum[sao_type_idx]; i++ ) | | |
| offset[ Depth ][ y ][ x ][ i ] = sao_offset | 2 | se(v)\|ae(v) |
| } | | |
| } | | |
| } | | |

Table 12 shows an example of a syntax structure in which only an effective band offset is transmitted. The effective band offset means an available band offset.

Since only information on the effective band offset is transmitted, it is necessary to transmit information on the number of band offsets to be applied, information indicating the band offsets, information indicating the offset values, and the like.

Here, total_offset_num_minus_one indicates the total number of offsets of the band offset. offset_idx[i] indicates to what category the band offset indicated by sao_type_idx corresponds. sao_offset indicates the offset value of the category indicated by the offset_idx[i] at the corresponding position and depth.

As described above, plural edge offsets may be applied to a single SAO application unit. Table 13 schematically shows an example of a syntax structure when plural edge offsets are applied to a single SAO application unit.

TABLE 13

| | C | Descriptor |
|---|---|---|
| sao_offset_param ( x, y, Depth ) { | | |
| if( split_flag[ Depth ][ y ][ x ] ) { | | |
| sao_offset_param ( x + 0, y + 0, Depth + 1 ) | | |
| sao_offset_param ( x + 1, y + 0, Depth + 1 ) | | |
| sao_offset_param ( x + 0, y + 1, Depth + 1 ) | | |
| sao_offset_param ( x + 1, y + 1, Depth + 1 ) | | |
| } else { | | |
| type_idx[ Depth ][ y ][ x ] = sao_type_idx | 2 | ue(v)\|ae(v) |
| if( sao_type_idx != 0 ) { | | |
| if( sao_type_idx <5 ) { | | |
| num_edge_offset | | |
| for( k = 0; k < num_edge_offset; k++ ) { | | |
| for( i = 0; i < PqaoOffsetNum[ sao_type_idx ]; i++ ) | | |
| offset[k][ Depth ][ y ][ x ][ i ] = sao_offset | | |
| } else { | | |
| for( i = 0; i < PqaoOffsetNum[ sao_type_idx ]; i++ ) | | |
| offset[0][ Depth ][ y ][ x ][ i ] = sao_offset | 2 | se(v)\|ae(v) |
| } | | |
| } | | |
| } | | |
| } | | |

With reference to Table 13 and Tables 8 to 11, when the value of sao_type_idx is less than 5, the edge offset is applied. Here, num_edge_offset indicates the total number of offsets of the edge offset.

With reference to Table 13, the edge offsets corresponding to the number indicated by num_edge_offset may be applied to the SAO application region.

<SAO Application to Chroma>

On the other hand, in consideration of the difference between luma and chroma in applying the SAO, the SAO may be applied to chroma pixels.

Figure 11:
FIG. 11 is a diagram illustrating local distributions of a histogram of the same picture.
Figure 11:
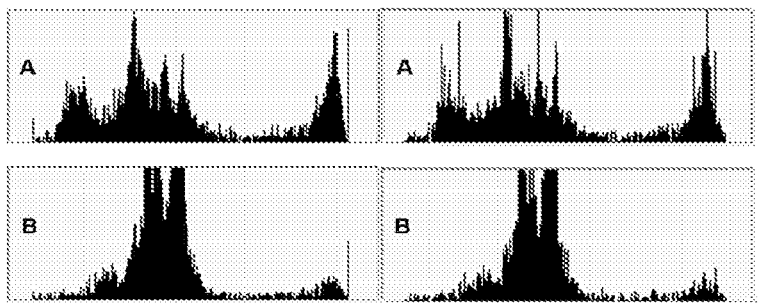
Figure 11:
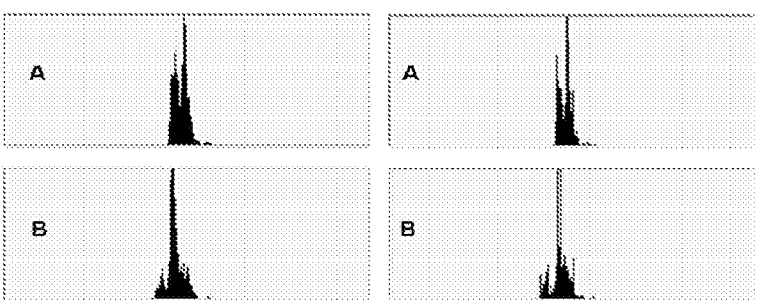
Figure 11:
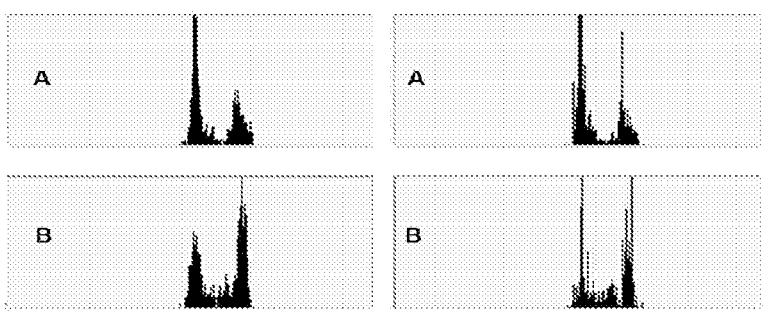

FIG. 11 illustrates local distributions of histograms for the same picture.

For example, FIG. 11(b) illustrates a histogram difference between a luma original picture and a reconstructed picture in Regions A and B in FIG. 11(a) which is in a picture of the same video.

FIG. 11(c) illustrates a histogram difference between a chroma (Cr) original picture and a reconstructed picture in Regions A and B in FIG. 11(a). FIG. 11(d) illustrates a histogram difference between a chroma (Cb) original picture and a reconstructed picture in Regions A and B in FIG. 11(a).

Referring to FIG. 11, it can be seen that a difference in picture characteristics between luma and chroma is present in the same picture. Therefore, in addition to the offset of a signal in luma pixels, the offset of a signal in chroma pixels may be independently transmitted in consideration of the characteristic difference between a luma signal and a chroma signal as in the example illustrated in FIG. 11. For example, in consideration of the number of luma pixels and the number of chroma pixels, an offset may be applied to the chroma pixels with a bit depth substantially smaller than the bit depth in the luma pixels.

Figure 12:
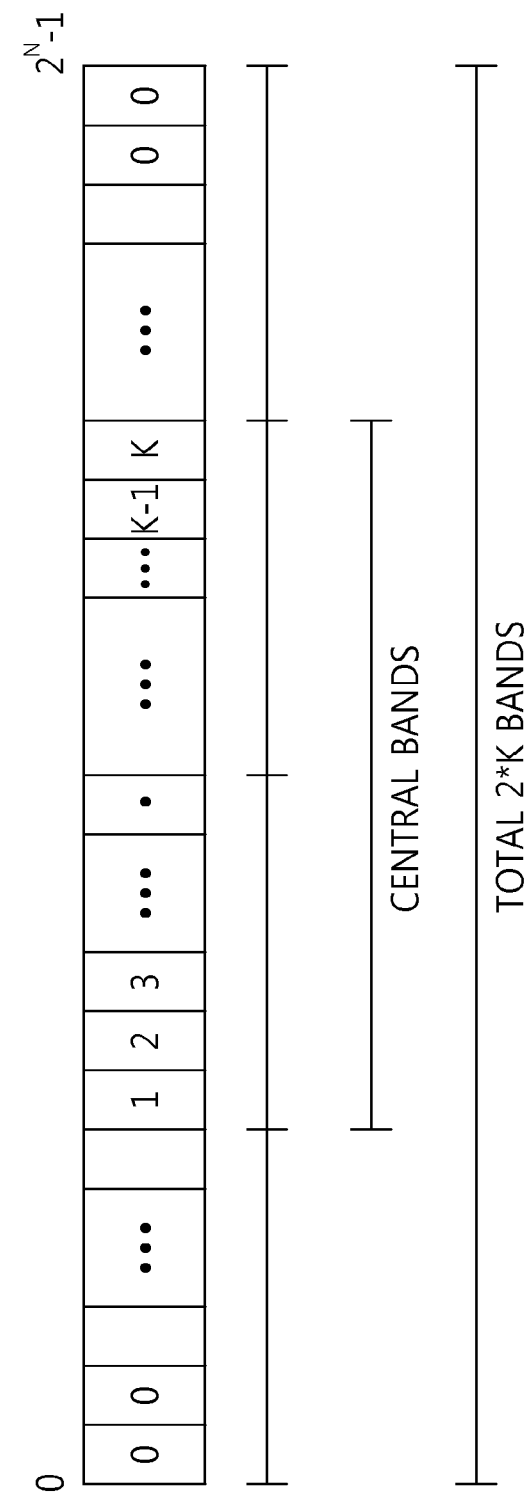
FIG. 12 is a diagram schematically illustrating an example where a band offset is applied to only some bands of the total bands for chroma pixels.
Figure 13:
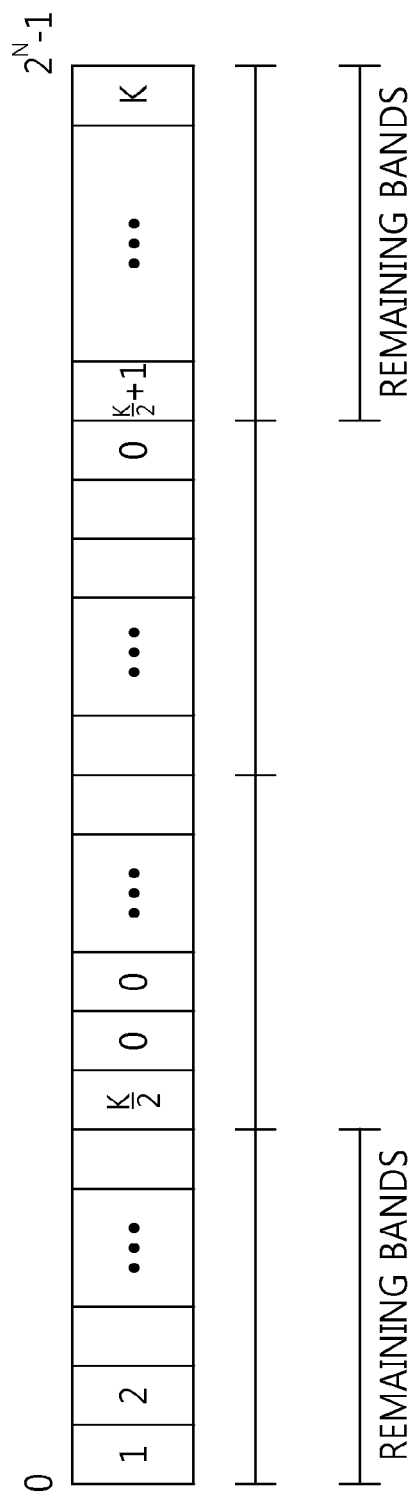
FIG. 13 is a diagram schematically illustrating another example where the band offset is applied to only some bands of the total bands for chroma pixels.

For example, when the range of a chroma signal, that is, the pixel value range of the chroma pixels, is from 0 to $2^N-1$ (where N is a bit depth), the magnitude of the entire bit depth, that is, the pixel value range, may be divided as in the example illustrated in FIG. 12 or 13.

FIG. 12 is a diagram schematically illustrating an example where a band offset is applied to only some bands of the total bands for the chroma pixels.

Referring to FIG. 12, chroma pixels may be allocated to the central bands including K bands at the center out of the total 2*K bands and the band offset may be applied thereto.

The offset values of the indices (1, 2, . . . , K) allocated to the respective bands may be transmitted from the encoder to the decoder. The indices of the offset values for the side bands to which the band offset is not applied may be set to 0 and the offset for the chroma pixels may not be indicated. An index having a value of 0 may indicate that the band offset should not be applied thereto, or may indicate that the offset value of the band offset is 0.

FIG. 13 is a diagram schematically illustrating another example where a band offset is applied to only some bands of the total bands for the chroma pixels.

Referring to FIG. 12, chroma pixels may be allocated to the remaining band including K bands at the sides out of the total 2*K bands and the band offset may be applied thereto.

The offset values of the indices (1, 2, . . . , K/2, K/2+1, . . . , K) allocated to the respective bands may be transmitted from the encoder to the decoder. The indices of the offset values for the central bands to which the band offset is not applied may be set to 0 and the offset for the chroma pixels may not be indicated. An index having a value of 0 may indicate that the band offset should not be applied thereto, or may indicate that the offset value of the band offset is 0.

In the examples illustrated in FIGS. 12 and 13, when it is assumed that the value of K is set to 16, the entire pixel value range may be divided into 32 bands, the bands may be classified into two groups of 16 bands at the center and the 16 bands at the side, and the band offset may be applied thereto.

By considering that the variance of the signals (pixel values) for the chroma pixels is smaller than that of the signals (pixel values) for the luma pixels, the total number of bands may be reduced and K=8 may be set. When K=8 is set, the total number of bands for applying the band offset is 16. The band offset may be applied to the chroma pixels using 8 central bands and 8 side bands. Here, the signals (luma signals) for the luma pixels are the pixels values (for example, intensities) of the luma pixels and are hereinafter referred to as "luma signals" for the purpose of convenience of explanation.

Table 14 schematically shows an example of the syntax sao_offset_param related to an offset out of the SAO parameters as a syntax structure for applying the SAO to chroma pixels.

TABLE 14

|  | C | Descriptor |
|---|---|---|
| sao_offset_param ( x, y, Depth ) { | | |
|   if( split_flag[ Depth ][ y ][ x ] ) { | | |
|     sao_offset_param ( x + 0, y + 0, Depth + 1 ) | | |
|     sao_offset_param ( x + 1, y + 0, Depth + 1 ) | | |
|     sao_offset_param ( x + 0, y + 1, Depth + 1 ) | | |
|     sao_offset_param ( x + 1, y + 1, Depth + 1 ) | | |
|   } else { | | |
|     type_idx[ Depth ][ y ][ x ] = sao_type_idx | 2 | ue(v)\|ae(v) |
|     if( sao_type_idx != 0 ) { | | |
|       for( i = 0; i < PqaoOffsetNum[ | | |
|       sao_type_idx ]; i++ ) | | |
|         offset[ Depth ][ y ][ x ][ i ] = sao_offset | 2 | se(v)\|ae(v) |
|     type_idx[ Depth ][ y ][ x ] = sao_type_cr_idx | | |
|     if( sao_type_cr_idx != 0 ) { | | |
|       for( i = 0; i < PqaoOffsetNum[ | | |
|       sao_type_cr_idx ]; i++ ) | | |
|         offset[ Depth ][ y ][ x ][ i ] = | | |
|         sao_cr_offset | | |
|     } | | |
|     type_idx[ Depth ][ y ][ x ] = sao_type_cb_idx | | |
|     if( sao_type_cb_idx != 0 ) { | | |
|       for( i = 0; i < PqaoOffsetNum[ | | |
|       sao_type_cb_idx ]; i++ ) | | |
|         offset[ Depth ][ y ][ x ][ i ] = | | |
|         sao_cb_offset | | |
|     } | | |
|   } | | |
|   } | | |
| } | | |

Referring to Table 14, sao_type_cr_idx indicates an offset type of a chroma (Cr) signal. sao_type_cb_idx indicates an offset type of a chroma (Cb) signal. sao_cr_offset indicates an offset value of a chroma (Cr) signal. sao_cb_offset indicates an offset value of a chroma (Cb) signal.

In the example shown in Table 14, when the offset type to be applied to the chroma (Cr) signals is indicated by sao_type_cr_idx, the offset value indicated by sao_cr_offset may be applied to the current pixel. When the offset type to be applied to the chroma (Cb) signals is indicated by sao_type_cb_idx, the offset value indicated by sao_cb_offset may be applied to the current pixel.

On the other hand, additional information may be reduced while maintaining performance of the chroma offset in consideration of the characteristic difference between chroma and luma. For example, a chroma signal is smaller in edge component and simpler than a luma signal.

Therefore, by setting two categories for the edge offsets without setting four categories as in case of luma, it is possible to reduce the additional information. For example, in the edge offset table shown in Table 1, Category 1 and Category 3 may be merged into a single category and Category 2 and Category 4 may be merged into a single category. By merging the categories, it is possible to reduce the amount of offset value data to be transmitted when the edge offset is applied.

Table 15 schematically shows an example of edge offset categories to be applied to chroma pixels.

TABLE 15

| Category | Condition |
|---|---|
| 1 | Intensity of C < Intensities of two neighboring pixels, or intensity of C < Intensity of one neighboring pixel and intensity of C = Intensity of one neighboring pixel |
| 2 | Intensity of C > Intensity of one neighboring pixel and intensity of C = Intensity of one neighboring pixel, or Intensity of C > Intensities of two neighboring pixels |
| 0 | No correspondence |

Referring to Table 15, when a direction (angle) of an edge is determined, a case in which the intensity of a current pixel (C) is less than the intensities of two neighboring pixels forming an edge or a case in which the intensity of the current pixel (C) is less than the intensity of one neighboring pixel are set to a single category (Category 1).

When a direction (angle) of an edge is determined, a case in which the intensity of the current pixel (C) is greater than the intensities of two neighboring pixels forming an edge or a case in which the intensity of the current pixel (C) is greater than the intensity of one neighboring pixel are set to a single category (Category 2).

Table 16 shows an example of an SAO type index table when the categories for the edge offsets are merged as shown in Table 15 and the number of bands for applying the band offset is set as illustrated in FIG. 12.

TABLE 16

| SAO type index Sao_type_idx | Number of SAO categories | Edge type (reference) |
|---|---|---|
| 0 | 0 | non-applied |
| 1 | 2 | 1D 0-degree edge |
| 2 | 2 | 1D 90-degree edge |
| 3 | 2 | 1D 135-degree edge |
| 4 | 2 | 1D 45-degree edge |
| 5 | 8 | central band |
| 6 | 0 | side band |

Referring to Table 16, for chroma pixel, the number of SAO categories may be reduced to two for the edge offset, and the offset may be applied to 8 bands at the center for the band offset, whereby it is possible to reduce an amount of information to be transmitted.

Table 17 shows an example of an SAO type index table when the categories for the edge offsets are merged as shown in Table 15 and the number of bands for applying the band offset is set as illustrated in FIG. 13.

TABLE 17

| SAO type index Sao_type_idx | Number of SAO categories | Edge type (reference) |
|---|---|---|
| 0 | 0 | non-applied |
| 1 | 2 | 1D 0-degree edge |
| 2 | 2 | 1D 90-degree edge |
| 3 | 2 | 1D 135-degree edge |
| 4 | 2 | 1D 45-degree edge |
| 5 | 0 | central band |
| 6 | 8 | side band |

Referring to Table 17, for chroma pixel, the number of SAO categories may be reduced to two for the edge offset, and the offset may be applied to 8 bands at the center for the band offset, whereby it is possible to reduce an amount of information to be transmitted.

Table 14 shows an example of a syntax structure when the same filtering partition is applied to the signals of luma pixels and the signals of chroma pixels, that is, when the same SAO application unit is used for the luma pixels and the chroma pixels.

In this regard, independent filtering partitions may be used for the signals of luma pixels and the signals of chroma pixels. That is, independent SAO application units may be used for luma pixels and chroma pixels.

Table 18 schematically shows an example of a syntax structure when independent partitions are used for the luma pixels and the chroma pixels.

TABLE 18

| | C | Descriptor |
|---|---|---|
| sao_param( ) { | | |
|   sao_flag | 2 | u(1)\|ae(v) |
|   if( sao_flag ) { | | |
|     sao_split_param( 0, 0, 0 ) | | |
|     sao_offset_param( 0, 0, 0, 0 ) | | |
|     sao_flag_cb | | |
|     if( sao_flag_cb ) { | | |
|       sao_offset_param( 0, 0, 0, 1 ) | | |
|     } | | |
|     sao_flag_cr | | |
|     if( sao_flag_cr ) { | | |
|       sao_offset_param( 0, 0, 0, 2 ) | | |
|     } | | |
|   } | | |
| } | | |

In the example shown in Table 18, when the value of sao_flag is 1, it indicates that the SAO may be used for the luma signal. When the value of sao_flag is 0, it indicates that the SAO is not used for the luma signal.

When the value of sao_flag_Cb is 1, it indicates that the SAO may be used for the Cb signal. When the value of sao_flag_Cb is 0, it indicates that the SAO is not used for the Cb signal.

When the value of sao_flag_Cr is 1, it indicates that the SAO may be used for the Cr signal. When the value of sao_flag_Cr is 0, it indicates that the SAO is not used for the Cr signal.

Referring to Table 18, x1 and x2 in sao_offset_param(x1, x2, x3, x4) specify the position of a region to which sao_offset_param is applied, x3 specifies the depth of the region to which sao_offset_param is applied. And x4 indicates that which of luma, Cr, and Cb sao_offset_param is for.

When all the values of sao_flag, sao_flag_cr, and sao_flag_cb are 1, the SAO is applied to luma, Cr and Cb and necessary parameters such as sao_split_param and sao_offset_param may be indicated. The SAO parameters may be transmitted as in the examples illustrated in FIGS. 18 and 19 to be described later.

Table 18 schematically shows an example of a syntax structure when independent partitions are used for the luma pixels and the chroma pixels.

TABLE 19

| | C | Descriptor |
|---|---|---|
| sao_split_param( x, y, Depth, component) { | | |
|   if( Depth < MaxSplitLevel ) | | |
|     split_flag[ Depth ][ y ][ x ] = sao_split_flag | 2 | u(1)\|ae(v) |
|   Else | | |
|     split_flag[ Depth ][ y ][ x ] = 0 | | |
|   if( split_flag[ Depth ][ y ][ x ] ) { | | |
|     sao_split_param( x + 0, y + 0, Depth + 1, component) | | |
|     sao_split_param( x + 1, y + 0, Depth + 1, component) | | |
|     sao_split_param( x + 0, y + 1, Depth + 1, component) | | |
|     sao_split_param( x + 1, y + 1, Depth + 1, component) | | |
|   } | | |
| } | | |

Referring to Table 19, when the value of sao_split_flag is 0, it indicates that a current region is a leaf. Therefore, the current region is not divided any more. When the value of sao_split_flag is 1, the current region is additionally divided into four child regions. Here, (x, y) in sao_split_flag(x, y, Depth, component) indicates the position of the region and Depth thereof indicates the depth of the region. In addition, "component" indicates to which of luma, Cr, and Cb sao_split_flag relates.

When the value of sao_split_flag is 1 and the region is additionally divided, the parameters sao_split_param related to luma, Cr, and/or Cb in the four divided regions may be transmitted.

Table 20 schematically shows an example of an offset parameter as a syntax structure when independent partitions are used for the luma pixels and the chroma pixels.

TABLE 20

| | C | Descriptor |
|---|---|---|
| sao_offset_param ( x, y, Depth, component ) { | | |
|   if( split_flag[ component ][ Depth ][ y ][ x ] ) { | | |
|     sao_offset_param ( x + 0, y + 0, Depth + 1, component ) | | |
|     sao_offset_param ( x + 1, y + 0, Depth + 1, component ) | | |
|     sao_offset_param ( x + 0, y + 1, Depth + 1, component ) | | |
|     sao_offset_param ( x + 1, y + 1, Depth + 1, component ) | | |
|   } else { | | |
|     type_idx[ component ] [ Depth ][ y ][ x ] = sao_type_idx | 2 | ue(v)\|ae(v) |
|     if( pqao_type_idx != 0 ) { | | |
|       for( i = 0; i < SaoOffsetNum[ sao_type_idx ]; i++ ) | | |
|         offset[ component ] [ Depth ][ y ][ x ][ i ] = sao_offset | 2 | se(v)\|ae(v) |
|     } | | |
|   } | | |
| } | | |

In the example shown in Table 20, sao_type_idx indicates an offset type to be applied to the current region. The offset type indicated by sao_type_idx may be indicated as the corresponding offset type in the SAO type tables shown in Tables 8 to 11 or Tables 16 and 17.

Here, sao_offset may indicate an offset to be applied to each pixel group, that is, each group when the total pixel values are classified into band groups as described above.

Figure 14:
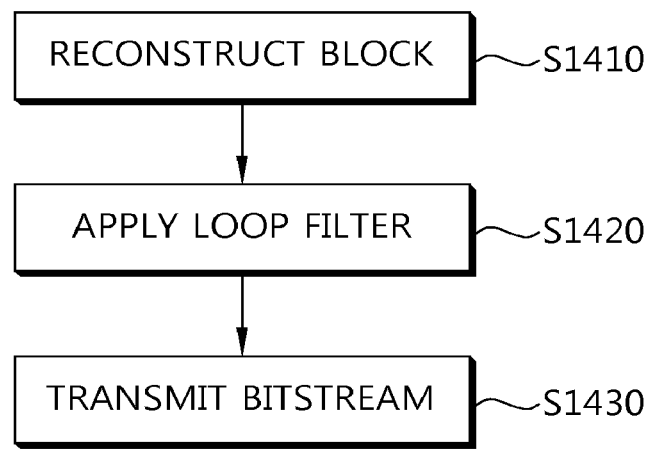
FIG. 14 is a flowchart schematically illustrating an operation of an encoder in a system according to the invention.

FIG. 14 is a diagram schematically illustrating the operation of the encoder in the system according to the invention.

Referring to FIG. 14, the encoder reconstructs a block (S1410). The encoder transforms and quantizes a residual block constructed on the basis of a prediction block and a current block and generates a reconstructed residual block through dequantization and inverse transform.

Subsequently, the encoder applies a loop filter to the reconstructed block (S1420). The loop filtering may be performed by the filter module illustrated in FIG. 1 and the deblocking filter, the SAO, the ALF, and the like may be applied. Here, the SAO may be applied to a picture having the deblocking filter applied thereto in the unit of pixels and the ALF may be applied to the picture having the SAO applied thereto. The ALF may be applied only when HE (High Efficiency) is necessary.

When the SAO is applied, the filter module may apply an offset in the unit of pixel. Here, the filter module may adaptively determine the number of offsets (the number of bands), the band groups, and the like for application of a band offset, or may transmit only the offsets for effective bands to the decoder. The filter module may apply plural edge offsets to the SAO application region. Specific details thereof are the same as described above.

The filter module may apply the SAO to chroma pixels. The SAO application region may be independently determined depending on luma and chroma. In addition, in case of the band offset for chroma, the number of bands and the band groups may be determined to apply the offset to the chroma pixels. In the edge offset for chroma, the number of categories in the direction of each edge may be adjusted. Specific details thereof are the same as described above.

The encoder may transmit a bitstream including picture information on application of the SAO and picture information on the SAO to the decoder (S1430).

Figure 15:
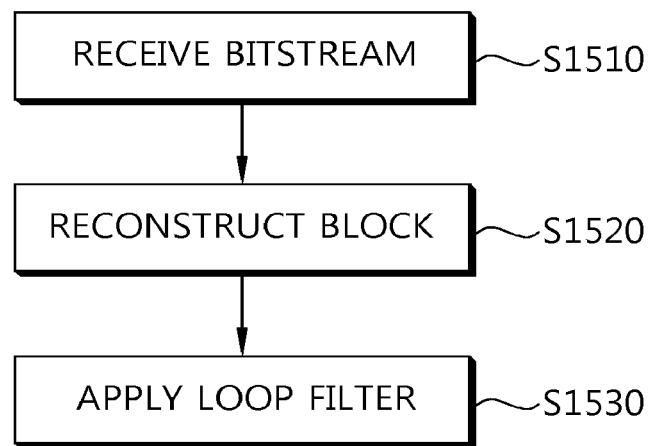
FIG. 15 is a flowchart schematically illustrating an operation of a decoder in a system according to the invention.

FIG. 15 is a diagram schematically illustrating the operation of the decoder in the system according to the invention.

Referring to FIG. 15, the decoder first receives a bitstream from the encoder (S1510). The received bitstream includes video information and information necessary for reconstructing the video information.

The decoder may reconstruct a block on the basis of the received information (S1520). The decoder may derive a reconstructed block on the basis of the prediction block generated by prediction and the residual block generated by dequantization and inverse transform.

The decoder may apply a loop filter to the reconstructed block (S1530). The loop filtering may be performed by the filter module illustrated in FIG. 2. The filter module may apply the deblocking filter, the SAO, and the ALF, and the like. Here, the SAO may be applied to a picture having the deblocking filter applied thereto in the unit of pixel, and the ALF may be applied to the picture having the SAO applied thereto. The ALF may be applied only when HE (High Efficiency) is necessary.

When the SAO is applied, the filter module may apply an offset in the unit of pixel. Here, the filter module may derive an SAO parameter on the basis of syntax elements transmitted from the encoder. The filter module may apply a band offset to a current pixel on the basis of the number of offsets (the number of bands), the band groups, and the like indicated by SAO application information such as the SAO parameter. Here, only an offset for an effective band may be transmitted to the decoder. The filter module may apply plural edge offsets to the SAO application region in accordance with indication of the SAO parameter or the like. Specific details thereof are the same as described above.

The filter module may apply the SAO to chroma pixel.

The SAO application region may be independently determined depending on luma and chroma and relevant information may be transmitted from the encoder. In addition, information on the number of bands and the band groups for applying the band offset to the chroma pixels and information on the number of categories for applying the edge offset to the chroma pixels may be transmitted from the encoder. The decoder may apply the SAO to the chroma pixels on the basis of the transmitted information. Specific details thereof are the same as described above.

While the methods in the above-mentioned exemplary system have been described on the basis of flowcharts as a series of steps or blocks, the invention is not limited to the order of the steps and a certain step may be performed in an order other than described above or at the same time as described above. The above-mentioned embodiments include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. A picture encoding method by an encoding apparatus, the method comprising:
    deriving a prediction sample in a current picture;
    generating a reconstructed picture based on the prediction sample;
    applying an in-loop filter process to the reconstructed picture,
    wherein the step of applying the in-loop filter process includes applying a deblocking filtering process to the reconstructed picture; and
    applying a sample adaptive offset (SAO) process to at least one of a luma sample or a chroma sample in the reconstructed picture after completing the deblocking filtering process; and
    encoding image information including prediction information for the prediction sample and offset information for the SAO process,
    wherein the offset information includes first flag information indicating whether the SAO process is enabled for the luma sample and second flag information indicating whether the SAO process is enabled for the chroma sample,
    wherein the offset information includes start band information indicating one of 32 bands as a starting band of a band group consisting of n bands among the 32 bands, the band group is determined based on the starting band, and an offset corresponding to a band among the n bands is applied to the luma sample or the chroma sample, wherein n is an integer.

2. The method of claim 1, wherein the offset information includes luma type information specifying an offset type for the luma sample, and chroma type information specifying an offset type for the chroma sample.

3. The method of claim 2, wherein the luma type information, and the chroma type information are encoded based on entropy encoding using a context-adaptive binary arithmetic coding.

4. The method of claim 2, wherein the offset information includes luma offset information specifying a magnitude of a first offset applied to the luma sample, and chroma offset information specifying a magnitude of a second offset applied to the chroma sample.

5. The method of claim 4, wherein the luma offset information and the chroma offset information are encoded based on entropy encoding using a context-adaptive binary arithmetic coding.

6. The method of claim 1, wherein the band is determined as a predetermined sample value range to which the luma sample belongs.

7. The method of claim 1, wherein the n is predetermined as a constant number.

8. The method of claim 1, wherein the band information indicating an ending band of the band group, the band group is determined based on both the starting band and the ending band.

9. A non-transitory computer-readable storage medium storing a bitstream generated by performing:
    deriving a prediction sample in a current picture;
    generating a reconstructed picture based on the prediction sample;
    applying an in-loop filter process to the reconstructed picture,
    wherein the step of applying the in-loop filter process includes applying a deblocking filtering process to the reconstructed picture; and
    applying a sample adaptive offset (SAO) process to at least one of a luma sample or a chroma sample in the reconstructed picture after completing the deblocking filtering process;
    encoding image information including prediction information for the prediction sample and offset information for the SAO process; and
    generating the bitstream including the image information,
    wherein the offset information includes first flag information indicating whether the SAO process is enabled for the luma sample and second flag information indicating whether the SAO process is enabled for the chroma sample,
    wherein the offset information includes start band information indicating one of 32 bands as a starting band of a band group consisting of n bands among the 32 bands, the band group is determined based on the starting band, and an offset corresponding to a band among the n bands is applied to the luma sample or the chroma sample, wherein n is an integer.

* * * * *